(12) United States Patent
Miles et al.

(10) Patent No.: US 10,000,641 B2
(45) Date of Patent: Jun. 19, 2018

(54) METHOD AND COMPOSITION FOR PREVENTING CORROSION OF METAL SURFACES

(75) Inventors: Andrew Frederick Miles, Aberdeenshire (GB); Neil Bretherton, Aberdeen (GB); Karla Richterova, Aberdeen (GB); Ali Naraghi, Missouri, TX (US)

(73) Assignee: Ecolab USA Inc., St. Paul, MN (US)

( * ) Notice: Subject to any disclaimer, the term of this patent is extended or adjusted under 35 U.S.C. 154(b) by 754 days.

(21) Appl. No.: 13/884,380

(22) PCT Filed: Nov. 8, 2011

(86) PCT No.: PCT/GB2011/052165
§ 371 (c)(1),
(2), (4) Date: May 9, 2013

(87) PCT Pub. No.: WO2012/063055
PCT Pub. Date: May 18, 2012

(65) Prior Publication Data
US 2013/0228095 A1     Sep. 5, 2013

(30) Foreign Application Priority Data

Nov. 9, 2010   (GB) .................................. 1018916.5

(51) Int. Cl.
*C09D 5/08*     (2006.01)
*C09K 8/54*     (2006.01)
(Continued)

(52) U.S. Cl.
CPC .................. *C09D 5/08* (2013.01); *C09K 8/54* (2013.01); *C10G 75/02* (2013.01); *C23F 11/14* (2013.01);
(Continued)

(58) Field of Classification Search
None
See application file for complete search history.

(56) References Cited

U.S. PATENT DOCUMENTS 3,770,055 A * 11/1973 Larsen ..................... C09K 8/54
166/275
5,393,464 A   2/1995 Martin et al.
(Continued)

FOREIGN PATENT DOCUMENTS

CN         1052151        6/1991
CN         101254431      9/2008
(Continued)

*Primary Examiner* — Joseph D Anthony
(74) *Attorney, Agent, or Firm* — Senniger Powers LLP

(57) ABSTRACT

The present invention provides a corrosion inhibitor composition comprising:
a carrier;
at least one compound of formulae (II)-(VII) or a salt or quaternized derivative thereof:

(Continued)

-continued

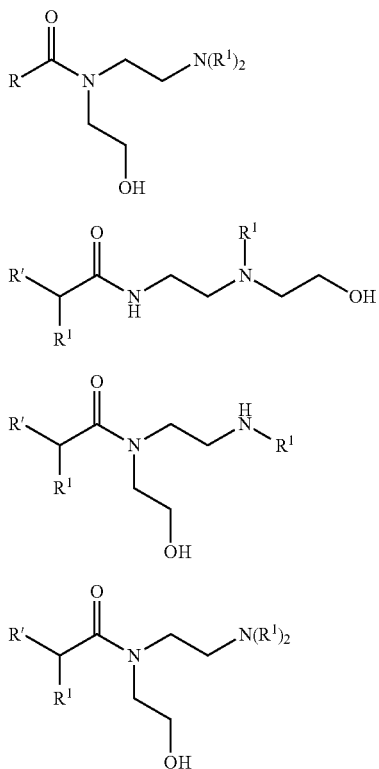

wherein

R is $C_{5-21}$ alkyl or alkenyl, preferably alkyl;

each $R^1$ is independently an optionally substituted group of formula —$(CH_2)_n X$ wherein n is an integer from 1 to 6 and X is $C(O)OZ$ or $SO_3Z$ and Z is H or a cation; and R' is $C_{4-20}$ alkyl or alkenyl, preferably alkyl; and a quaternary ammonium compound.

30 Claims, 4 Drawing Sheets

(51) Int. Cl.
    *C10G 75/02*         (2006.01)
    *C23F 11/14*         (2006.01)

(52) U.S. Cl.
    CPC .......... *C23F 11/141* (2013.01); *C23F 11/145* (2013.01); *C10G 2300/4075* (2013.01)

(56) References Cited

U.S. PATENT DOCUMENTS

| | | | |
|---|---|---|---|
| 6,866,797 B1* | 3/2005 | Martin | C09K 8/54 |
| | | | 252/389.2 |
| 2006/0062753 A1* | 3/2006 | Naraghi | A01N 33/12 |
| | | | 424/78.27 |
| 2008/0227668 A1* | 9/2008 | Welton | C09K 8/74 |
| | | | 507/239 |
| 2009/0032058 A1* | 2/2009 | McRae | C11D 1/90 |
| | | | 134/4 |
| 2010/0084611 A1* | 4/2010 | Acosta | C07D 241/04 |
| | | | 252/392 |
| 2010/0304018 A1* | 12/2010 | Achour | C09K 8/54 |
| | | | 427/156 |
| 2011/0009493 A1* | 1/2011 | Hall | A01N 33/12 |
| | | | 514/642 |

FOREIGN PATENT DOCUMENTS

| | | |
|---|---|---|
| CN | 101254435 | 9/2008 |
| CN | 101354430 | 9/2008 |
| EP | 0836669 | 7/2001 |
| JP | 53095845 | 8/1978 |
| WO | 9633953 | 10/1996 |
| WO | WO 2005/083026 A2 * | 9/2005 |

\* cited by examiner

METHOD AND COMPOSITION FOR PREVENTING CORROSION OF METAL SURFACES

The present invention concerns a corrosion inhibitor composition comprising a carrier, at least one compound that is a ring-opened derivative of a $C_{5-21}$ alkylhydroxyethyl imidazoline or a salt or quaternary derivative thereof and a quaternary ammonium compound. The invention also relates to methods of preparing the corrosion inhibitor composition, to kits for preparing the corrosion inhibitor composition and to methods and uses of the composition to prevent corrosion, particularly of metal surfaces used in the recovery, transportation or refining of hydrocarbons (oil and gas).

BACKGROUND

During recovery, transportation and refining of hydrocarbons, the hydrocarbons are associated with other substances that can cause the metallic surfaces of the devices and equipment to undergo corrosion. Generally this is the process by which a corrosive substance reacts with a metal surface, often by oxidation. During oil and gas recovery, this is usually anaerobic corrosion, i.e. only low levels of oxygen are present. A common strategy used to mitigate this problem is to employ corrosion inhibitors.

A critical disadvantage of many commercially available corrosion inhibitors is that they do not meet internationally agreed environmental standards. For example, the Harmonized Mandatory Control System (HMCS) of the Oslo-Paris Convention for the Protection of the North-East Atlantic (OSPAR Convention) requires a standard environmental data-set for each chemical substance, including results for biodegradation, bioaccumulation and aquatic toxicity. The data presented for each substance are compared to a set of criteria that must be met in order for the composition to be permitted for use.

These environmental criteria, and in particular, toxicity to marine algae, are typically not met by many substances used in commercially available corrosion inhibitors. For example, measurement of the effective concentration of the substance that is sufficient to cause a reduction in growth rate for more than 50% of the algae population (termed $EC_{50}$) is often less than 1 mg/L, and in some cases less than 0.1 mg/L. Ideally, values of $EC_{50}$ should be >1 mg/L, more preferably >10 mg/L and more preferably higher than this. In other examples, the substances show poor biodegradation, or are considered likely to bioaccumulate.

Consequently a need exists for corrosion inhibitor compositions that are environmentally acceptable but which are also effective corrosion inhibitors. The inventors of the present invention have now found that both of these requirements are met by compositions comprising at least one compound that is a ring-opened derivative of a $C_{5-21}$ alkylhydroxyethyl imidazoline and a quaternary ammonium compound. Such compositions have been found to have surprisingly low toxicity to marine algae (i.e. surprisingly high $EC_{50}$ values), acceptable biodegradation and/or acceptable bioaccumulation as well as useful corrosion inhibition properties. One group of compounds that have been found to be particularly useful are commonly called amphoacetates, alkylamidoamineglycinates or amphocarboxyglycinates. Two other related groups of particular interest are known as di-acetates and amphosulfonates. The ring-opened derivatives of $C_{5-21}$ alkylhydroxyethyl imidazolines have been found to be especially effective when used in combination with alkyl quaternary amines (alkyl quats) and/or alkyl quaternary esteramines (ester quats). Compositions comprising a combination of these compounds exhibit synergy in their corrosion inhibition properties.

The derivatives of $C_{5-21}$ alkylhydroxyethyl imidazolines described above are known compounds. They are, for example, used in textile wetting agents, hard surface cleaners, shampoos, skin cleansers and personal care products. As far as the applicant is aware, however, there are no commercially available corrosion inhibitors that comprise derivatives of $C_{5-21}$ alkylhydroxyethylimidazolines as herein described.

SUMMARY OF INVENTION

Thus viewed from a first aspect the present invention provides a corrosion inhibitor composition comprising:
a carrier;
at least one compound of formulae (II)-(VII) or a salt or quaternised derivative thereof:

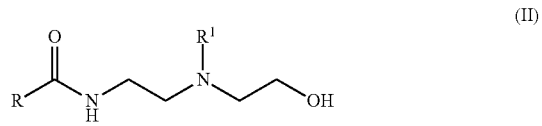

(II)

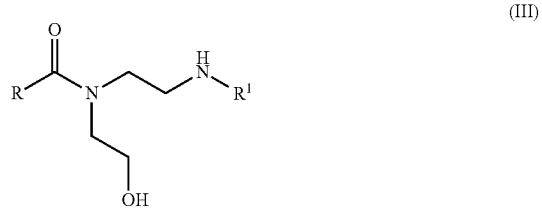

(III)

(IV)

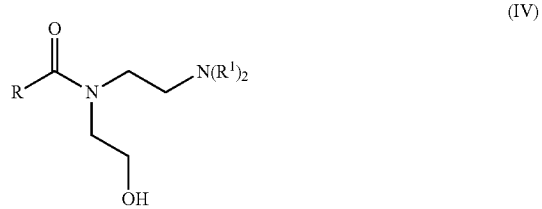

(V)

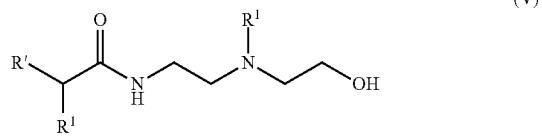

(VI)

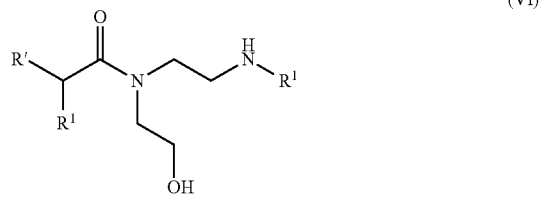

(VII)

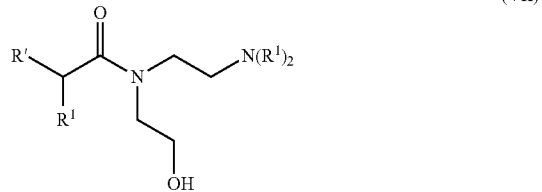

wherein
R is $C_{5-21}$ alkyl or alkenyl, preferably alkyl;
each $R^1$ is independently an optionally substituted group of formula —$(CH_2)_nX$ wherein n is an integer from 1 to 6 and X is C(O)OZ or $SO_3Z$ and Z is H or a cation; and
R' is $C_{4-20}$ alkyl or alkenyl, preferably alkyl; and
a quaternary ammonium compound.

Viewed from a further aspect the present invention provides a method of making a corrosion inhibitor composition as hereinbefore defined comprising comprising mixing a carrier, at least one compound of formulae (II)-(VII) or a salt or quaternised derivative thereof and a quaternary ammonium compound.

Viewed from a still further aspect the present invention provides the use of a corrosion inhibitor composition as hereinbefore defined to reduce, inhibit or prevent corrosion of a metal surface, e.g. a metal surface used in the recovery, transportation or refining of hydrocarbon.

Viewed from a yet further aspect the present invention provides a method of reducing, inhibiting or preventing corrosion of a metal surface, e.g. a metal surface used in the recovery, transportation or refining of hydrocarbon, comprising contacting said surface with a corrosion inhibitor composition as hereinbefore defined.

Viewed from a yet further aspect the present invention provides a kit for the preparation of a corrosion inhibitor composition as hereinbefore defined comprising:
(i) a first container comprising at least one compound of formulae (II)-(VII) or a salt or quaternised derivative thereof as hereinbefore defined;
(ii) a second container comprising an alkyl quat and/or an ester quat as hereinbefore defined; and
(iii) instructions for preparation of the corrosion inhibitor composition.

Preferred corrosion inhibitor compositions of the present invention comprise one or more quaternary ammonium compounds selected from an alkyl quat, an ester quat, an amido quat, a pyridine quat, a benzyl quat, a polymeric quat or a bis ammonium quat. Preferably the quaternary ammonium ammonium compound is an alkyl quat, an ester quat and/or a polymeric quat.

DETAILED DESCRIPTION

As used herein the term "corrosion inhibitor" refers to a substance that prevents or reduces the deterioration of a metal surface by oxidation or other chemical reaction. Corrosive substances that can cause corrosion, particularly of metal surfaces used during the recovery, transportation and refining of hydrocarbon, include water with high salt contents, acidic inorganic compounds such as carbon dioxide ($CO_2$) or hydrogen sulfide ($H_2S$) and natural organic acids. Preferred corrosion inhibitor compositions of the present invention reduce, inhibit or prevent the destructive effect such substances have on metal surfaces.

The corrosion inhibitor compositions of the present invention comprise a carrier and a compound of formulae (II)-(VII) that is a ring-opened derivative of a $C_{5-21}$ alkylhydroxyethyl imidazoline or a salt or quaternary derivative thereof. As used herein the term "ring-opened derivative of a $C_{5-21}$ alkylhydroxyethyl imidazoline" refers to a compound of formula (II)-(VII) that is preferably obtained from a $C_{5-21}$ alkylhydroxyethyl imidazoline by a ring-opening chemical reaction. Preferred $C_{5-21}$ alkylhydroxyethyl imidazolines for the preparation of derivatives are compounds of formula (I) shown below:

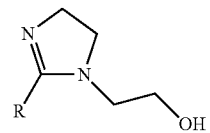
(I)

wherein R is $C_{5-21}$ alkyl or alkenyl.

Compounds of formula (I) may be commercially available or synthesised using conventional chemistry. Aminoethylethanolamine may, for instance, be condensed with an appropriate acid (RCOOH) to produce a monoamide that may be dehydrated to form a compound of formula (I). Examples of suitable acids include lauric acid, myristic acid, palmitic acid and oleic acid, although other types with chain lengths from $C_5$ to $C_{21}$ may also be used. Mixed or refined fatty acids originally derived from natural sources, such as coco fatty acids, tallow, tall oil, palm oil, rapeseed, mustard seed, soya or fish may also be used. This synthesis is shown in FIG. 1. Other preparation routes will also be apparent to the skilled man.

In preferred compounds of formula (I), R is $C_{7-19}$ alkyl or alkenyl, more preferably $C_{9-17}$ alkyl or alkenyl, still more preferably $C_{11-15}$ alkyl or alkenyl, particularly $C_{11}$ alkyl or alkenyl.

When R is alkenyl in compounds of formula (I), it preferably comprises 1, 2 or 3 double bonds, particularly preferably 1 or 2 double bonds, e.g. 1 double bond. Preferably, however, R is alkyl.

As used herein, the term alkyl group refers to any saturated hydrocarbon group. Thus the alkyl group may be substituted or unsubstituted, but is preferably unsubstituted. The alkyl group may be a cyclic or acyclic group, but preferred alkyl groups are acyclic. Alkyl groups may also be branched or unbranched. Generally unbranched alkyl groups are preferred.

As used herein, the term alkenyl group refers to any unsaturated hydrocarbon comprising at least one carbon to carbon double bond. As with alkyl groups, the alkenyl group may be substituted or unsubstituted, but is preferably unsubstituted. The alkenyl group may be cyclic or acyclic, but is preferably acyclic. Alkenyl groups may be branched or unbranched, but are preferably unbranched.

Preferred compounds of formulae (II)-(VII) are derivatives of $C_{5-21}$ alkylhydroxyethyl imidazolines obtainable by ring opening of a compound of formula (I) as hereinbefore defined.

The compositions of the present invention comprise at least one compound of formulae (II)-(VII) or salts or quaternised derivatives thereof:

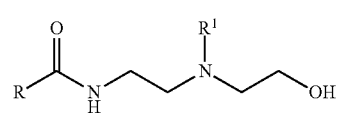
(II)

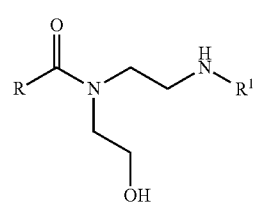
(III)

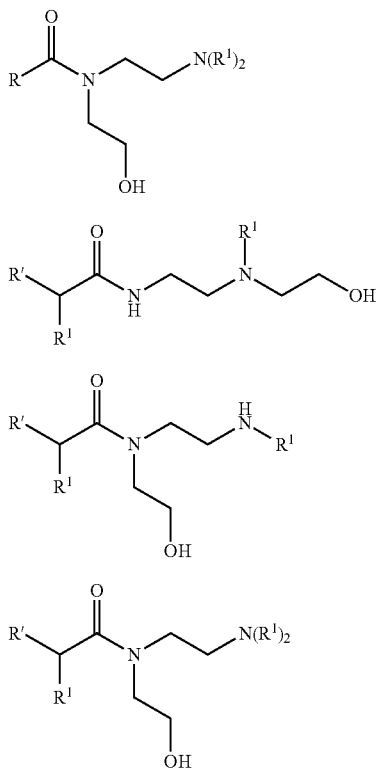

wherein
R is $C_{5-21}$ alkyl or alkenyl, preferably alkyl;
each $R^1$ is independently an optionally substituted group of formula $-(CH_2)_nX$ wherein n is an integer from 1 to 6 and X is C(O)OZ or $SO_3Z$ and Z is H or a cation (e.g. $R^1$ is $CH_2COOZ$ or $CH_2CH(OH)CH_2SO_3Z$); and
R' is $C_{4-20}$ alkyl or alkenyl, preferably alkyl.

The terms alkyl and alkenyl are used in relation to these formulae as defined above in relation to formula (I).

Compounds (II)-(VII) are preferably obtained by ring opening of a $C_{5-21}$ alkylhydroxyethyl imidazoline, e.g. a compound of formula (I), and derivatisation with at least one group $R^1$. Representative examples of reaction schemes to yield compounds of formulae (II)-(VII) are shown in FIG. 2. Such schemes, as well as alternatives, are well known in the prior art, e.g. from EP-A-713860.

Referring to FIG. 2, route A illustrates a synthesis wherein a compound of formula (I) is hydrolysed to yield intermediate (a) comprising a secondary amine. The secondary amine may subsequently undergo a nucleophilic reaction, e.g. a substitution reaction, to yield compounds of formula (II). Substitution reactions may, for instance, be carried out with compounds of formula $R^1L$ wherein L is leaving group, e.g. halogen. Suitable compounds include halocarboxylic acids (e.g. chloroacetic acid). Conventional reaction conditions known in the art may be employed.

As shown in FIG. 2, the compounds of formula (II) may additionally be derivatised at the carbon atom adjacent to the amide carbonyl. Such derivatisation may be achieved by reaction of the compound of formula (II) with a strong base to generate a carbanion that undergoes a nucleophilic reaction, e.g. a substitution or Mannich reaction as described above. This yields compounds of formula (V). In compounds of formula (V) each $R^1$ may be the same or different.

Route B in FIG. 2 exemplifies the alternative outcome of ring opening of a compound of formula (I). It yields intermediate (b) comprising a primary amine. Like intermediate (a), intermediate (b) may undergo a nucleophilic reaction, e.g. a substitution to yield compounds of formula (III). Compounds of formula (III) are, however, secondary amines and thus may undergo a second amine derivatisation to yield compounds of formula (IV). In compounds of formula (IV) each $R^1$ may be the same or different.

Although not shown on FIG. 2, the compounds of formulae (III) and (IV) may also be derivatised at the carbon atom adjacent to the amide carbonyl as described above in relation to compounds of formula (II). These reactions produce compounds of formulae (VI) and (VII) respectively as shown above.

In compounds of formulae (IV) to (VII), each $R^1$ may be different. More preferably, however, each $R^1$ is the same.

In preferred compounds of formulae (II)-(VII) R is $C_{7-19}$ alkyl or alkenyl, more preferably $C_{9-17}$ alkyl or alkenyl, still more preferably $C_{11-15}$ alkyl or alkenyl, particularly $C_{11}$ alkyl or alkenyl.

When R is alkenyl in compounds of formulae (II)-(VII), it preferably comprises 1, 2 or 3 double bonds, particularly preferably 1 or 2 double bonds, e.g. 1 double bond. Preferably, however, R is alkyl.

In further preferred compounds of formulae (II)-(VII) $R^1$ is an optionally substituted group of formula $-(CH_2)_nX$ wherein n is an integer from 1 to 4, more preferably 1, 2 or 3, still more preferably 1 or 3, e.g. 1.

The group of formula $-(CH_2)_nX$ may be substituted or unsubstituted. When n is 1 or 2, preferably the group of formula $-(CH_2)_nX$ is unsubstituted. When n is 3 or more (e.g. 3), the group of formula $-(CH_2)_nX$ is preferably substituted. Substituents that may be present in the group of formula $-(CH_2)_nX$ include hydroxy and alkoxy.

In further preferred compounds of formulae (II)-(VII) $R^1$ is an optionally substituted group of formula $-(CH_2)_nX$ wherein X is C(O)OZ. In other cases, $R^1$ is an optionally substituted group of formula $-(CH_2)_nX$ wherein X is $SO_3Z$. In both cases Z is preferably H or a cation, e.g. a metal cation, particularly $Na^+$ or $K^+$, especially $Na^+$.

Particularly preferred compounds of formulae (II)-(VII) include those wherein $R^1$ is an unsubstituted group of formula $-(CH_2)_nX$ wherein n is an integer from 1 to 6 (e.g. 1), X is C(O)OZ and Z is H or a cation, e.g. a metal cation such as $Na^+$. Particularly preferably $R^1$ is $-CH_2C(O)OZ$ and Z is H or a cation, e.g. a metal cation such as $Na^+$.

Other particularly preferred compounds of formulae (II)-(VII) include those wherein $R^1$ is a substituted group of formula $-(CH_2)_nX$ wherein n is an integer from 3 to 6 (e.g. 3 or 4), X is $SO_3Z$ and Z is H or a cation, e.g. a metal cation, especially Nat Particularly preferably $R^1$ is a hydroxy or $C_{1-4}$ alkoxy substituted group of formula $-(CH_2)_nX$ wherein n is an integer from 3 to 6, X is $SO_3Z$ and Z is H or a cation, e.g. a metal cation, especially $Na^+$. For instance, $R^1$ may be $-CH_2CH(OH)CH_2SO_3Z$ and Z is H or a cation, e.g. a metal cation, especially $Na^+$.

The compositions of the present invention may comprise compounds of formulae (II)-(VII) in the form of salts. Suitable salts may be formed by any conventional technique, e.g. anion exchange. The salts may be organic salts but are more preferably inorganic salts. Salts of the amine nitrogen atoms of compounds of formulae (II)-(VII) may, for example, be formed with acids. Suitable acids for this purpose include hydrochloric, nitric, hydrobromic, phosphoric, sulphuric and sulphonic acids.

The compositions of the present invention may also comprise compounds of formulae (II)-(VII) in the form of quaternised derivatives, typically quaternary salts. Quaternisation may, for example, be carried out using an alkylating agent. As used herein the term "alkylating agent" refers to any compound that is capable of transferring an alkyl group to a compound of formula (II)-(VII). Alkylating agents generally comprise a leaving group as the transfer of the alkyl group occurs by nucleophilic attack on the alkylating agent by the amine nitrogen of the compound of formula (II)-(VII). As used herein, the term leaving group refers to any group that is capable of accepting electrons during heterolytic bond cleavage. Generally leaving groups are capable of stabilizing a negative charge. Representative examples of suitable leaving groups include sulfates and halides (e.g. chloride, bromide, iodide). Correspondingly preferred alkylating agents include alkyl sulfates and alkyl halides. Examples of alkylating agents include methyl chloride and dimethyl sulfate.

Representative examples of particularly preferred compounds of formulae (II) include:

R—CONH—CH$_2$—CH$_2$—N(CH$_2$—CH$_2$—OH)—CH$_2$—COOZ wherein Z is H$^+$ or Na$^+$ and R is C11, C13 or C17 or mixtures thereof. Preferably R is C11. Still more preferably R derives from lauric acid.

R—CONH—CH$_2$—CH$_2$—N(CH$_2$—CH$_2$—OH)—CH$_2$—CH(OH)—CH$_2$—SO$_3$Z wherein Z is H$^+$ or Na$^+$ and R is C11, C13, C17 or mixtures thereof. Preferably R is C11. Still more preferably R derives from lauric acid.

R—CONH—CH$_2$—CH$_2$—N(CH$_2$—CH$_2$—OH)—CH$_2$—CH$_2$—COOZ wherein Z is H$^+$ or Na$^+$ and R is C17:1. R preferably derives from oleic acid.

Representative examples of particularly preferred compounds of formulae (III) include:

R—CON(CH$_2$—CH$_2$—OH)—CH$_2$—CH$_2$—NH—CH$_2$—COOZ wherein Z is H$^+$ or Na$^+$ and R is C11, C13 or C17 or mixtures thereof. Preferably R is C11. Still more preferably R derives from lauric acid.

R—CON(CH$_2$—CH$_2$—OH)—CH$_2$—CH$_2$—NH—CH$_2$—CH(OH)CH$_2$—SO$_3$Z wherein Z is H$^+$ or Na$^+$ and R is C11, C13, C17 or mixtures thereof. Preferably R is C11. Still more preferably R derives from lauric acid.

R—CON(CH$_2$—CH$_2$—OH)—CH$_2$—CH$_2$—NH—CH$_2$—CH$_2$—COOZ wherein Z is H$^+$ or Na$^+$ and R is C17:1. R preferably derives from oleic acid.

Representative examples of particularly preferred compounds of formulae (IV) include:

R—CON(CH$_2$—CH$_2$—OH)—CH$_2$—CH$_2$—N—(CH$_2$—COO)$_2$(Z)$_2$ wherein each Z is H$^+$ or Na$^+$ and R is C11, C13 or C17 or mixtures thereof. Preferably R is C11. Still more preferably R derives from lauric acid.

R—CON(CH$_2$—CH$_2$—OH)—CH$_2$—CH$_2$—N—(CH$_2$—CH(OH)CH$_2$—SO$_3$)$_2$(Z)$_2$ wherein each Z is H$^+$ or Na$^+$ and R is C11, C13, C17 or mixtures thereof. Preferably R is C11. Still more preferably R derives from lauric acid.

R—CON(CH$_2$—CH$_2$—OH)—CH$_2$—CH$_2$—N—(CH$_2$—CH$_2$—COO)$_2$(Z)$_2$ wherein each Z is H$^+$ or Na$^+$ and R is C17:1. R preferably derives from oleic acid.

Compounds of formulae (II)-(VII) are commercially available. Representative examples of suitable commercially available products comprising compounds of formulae (II)-(VII) include:

Mixture A—mixture containing mainly compounds of formulae II and III wherein R is C11 (derived from lauryl fatty acid) and R$^1$ is COONa.

Mixture B—mixture containing mainly compounds of formulae II and III wherein R is derived from coco fatty acid and R$^1$ is COONa.

Mixture C—mixture containing mainly compounds of formulae II and III wherein R is C11 (derived from lauryl fatty acid) and R$^1$ is —CH$_2$CH(OH)CH$_2$SO$_3$Na.

Preferred corrosion inhibitor compositions of the present invention comprise at least one compound of formula (II), (III) or (IV). Particularly preferred compositions comprise at least one compound of formula (II) or (III). Especially preferred compositions comprise a mixture of compounds of formulae (II) and (III).

The corrosion inhibitor compositions of the present invention may comprise a mixture of two or more (e.g. 2, 3 or 4) compounds of formulae (II)-(VII). Compositions of the present invention may, for example, comprise at least one compound of formula (II) and at least one compound selected from a compound of formula (III), (IV), (V) (VI) and (VII). Alternatively the compositions of the present invention may comprise at least one compound of formula (III) and at least one compound selected from a compound of formula (II), (IV), (V), (VI) and (VII). A yet further possibility is that the compositions of the present invention may comprise at least one compound of formula (II), at least one compound of formula (III) and at least one compound selected from a compound of formula (IV), (V), (VI) and (VII).

The corrosion inhibitor compositions of the present invention preferably comprise compounds of formulae (II)-(VII) that have a toxicity (EC$_{50}$), measured by a standard test: ISO 10253 1998 water quality-marine algal growth inhibition test with *Skeletonema costatum*, of at least 0.5 mg/L, more preferably at least 2.0 mg/L, still more preferably at least 10 mg/L, e.g. at least 25 mg/L. The lower the toxicity of the compounds the more desirable they are therefore there is no real upper limit on what the EC$_{50}$ value of the compounds may be. It may be, for instance, 100 or 500 mg/L.

The corrosion inhibitor compositions of the present invention preferably further comprise one or more surfactant(s). The surfactants may be an anionic, cationic, non-ionic or amphoteric surfactant.

Representative examples of suitable cationic surfactants include:

C$_{6-22}$ alkyl amines (R—NH$_2$), di C$_{6-22}$ alkyl amines (R$_2$—NH) or tri C$_{6-22}$ alkyl amines (R—N) (such as fatty coconut, tallow or oleic monoalkyl amines and dialkyl amines), in the form of an addition salt from the neutralization with organic (acetic, citric, oleic, etc.) or inorganic (hydrochloric, etc) acids;

C$_{6-22}$ alkyl dimethyl amines (R—N(CH$_3$)$_2$) and di C$_{6-22}$ alkyl methyl amines (R$_2$—NCH$_3$) from coconut, tallow or oleic fats, in the form of an addition salt from the neutralization of organic (acetic, citric, oleic, etc.) or inorganic (hydrochloric, etc) acids;

Alkoxylated $C_{6-22}$ alkyl amines (R—NH$_2$), di $C_{6-22}$ alkyl amines (R$_2$—NH) or tri $C_{6-22}$ alkyl amines (R$_3$—N), generally ethoxylated and/or propoxylated (such as fatty coconut, tallow or oleic monoalkyl amines and dialkyl amines with 2-30 moles of ethylene and/or propylene oxide), optionally quaternized with suitable alkylating agents such as dimethyl sulphate, methyl chloride or benzyl chloride, or in the form of an addition salt from the neutralization with organic (acetic, citric, oleic, etc) or inorganic (hydrochloric, etc) acids;

Alkylene polyamines, such as $C_{6-22}$ alkyl propylene diamines (R—NH—(CH$_2$)$_3$—NH$_2$), $C_{6-22}$ alkyl propylene triamines (R—NH—(CH$_2$)$_3$—NH—(CH$_2$)$_3$—NH$_2$), $C_{6-22}$ alkyl propylene tetraamines (linear and branched), in the form of an addition salt from the neutralization of organic (acetic, citric, oleic, etc) or inorganic (hydrochloric, etc) acids;

Alkoxylated alkylene polyamines, generally ethoxylated and/or propoxylated, such as fatty coconut, tallow or oleic $C_{6-22}$ alkyl propylene diamines (R—NH—(CH$_2$)$_3$—NH$_2$), fatty coconut, tallow or oleic $C_{6-22}$ alkyl propylene triamines (R—NH—(CH$_2$)$_3$—NH—(CH$_2$)$_3$—NH$_2$), fatty coconut, tallow or oleic $C_{6-22}$ alkyl propylene tetraamines (linear and branched), with 2 to 30 moles of ethylene and/or propylene oxide, optionally quaternized with suitable alkylating agents such as dimethyl sulphate, methyl chloride or benzyl chloride, or in the form of an addition salt from the neutralization with organic (acetic, citric, oleic, etc) or inorganic (hydrochloric, etc) acids;

$C_{6-22}$ alkyl ether amines;

$C_{6-22}$ alkyl imidazolines; and $C_{6-22}$ alkyl amidoamines.

Representative examples of suitable amphoteric surfactants include betaine-type compounds:

$C_{6-22}$ alkyl dimethyl betaines (R—N(CH$_3$)$_2$$^+$—CH$_2$COO$^-$), obtained from a $C_{6-22}$ alkyl dimethyl amine which is reacted with sodium monochloroacetate, such as $C_{12-14}$ dimethyl betaine (carboxylate methyl $C_{12-14}$ alkyl dimethylammonium);

$C_{6-22}$ alkyl amido betaines (R—CO—NH—CH$_2$CH$_2$CH$_2$—N(CH$_3$)$_2$$^+$—CH$_2$COO$^-$), obtained by the reaction of sodium monochloroacetate with the reaction product of dimethyl amino propylamine with $C_{6-22}$ fatty acids or its methyl esters, such as $C_{10-18}$ amidopropyl dimethylamino betaine;

$C_{6-22}$ alkyl and $C_{6-22}$ alkyl amido sulphobetaines (R—CO—NH—CH$_2$CH$_2$CH$_2$—N(CH$_3$)$_2$$^+$—CH$_2$CHOH—CH$_2$SO$_3$$^-$), similar products to those previously described in which the carboxylic group has been substituted by a sulphonic group, such as $C_{10-18}$ dimethyl sulphohydroxybetaine, $C_{10-18}$ amido propyl dimethylamino sulphohydroxybetaine; and soybean lecithin.

Representative examples of suitable non-ionic surfactants include:

Alcohols;

Alkanolamides;

Amides derived from alkanolamides (coconut fatty acid monoethanolamide, coconut fatty acid diethanolamide, oleic acid diethanolamide, vegetable oil fatty acid diethanolamide);

Alkoxylated fatty amides, generally ethoxylated and/or propoxylated (such as coconut fatty acid monoethanolamide with 4 moles of ethylene oxide), amine oxides, such as N-cocoamidopropyl dimethyl amine oxide, dimethyl $C_{6-22}$ amine oxide, such as dimethyl coco amine oxide;

Esters, such as ethoxylated and/or propoxylated fatty acids (castor oil with 2 to 40 moles of ethylene oxide), ethoxylated and/or propoxylated glycerides (PEG-24 glyceryl monostearate), glycol esters and derivatives, monoglycerides, polyglyceryl esters, esters and ethers of polyalcohols, sorbitan/sorbitol esters and phosphoric acid trimesters; and Ethers such as ethoxylated and/or propoxylated fatty alcohols (cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, ethoxylated polysiloxanes, PEG propoxylated ethers (PPG-1-PEG-9-lauryl glycol ether), ethoxylated and/or propoxylated alkylphenols.

Representative examples of suitable anionic surfactants include:

Phosphate esters and their metal salts including $C_{6-22}$ alkyl mono and di-substituted esters;

Phosphate esters and their metal salts, including $C_{6-22}$ alkyl mono and di-substituted esters also containing ethylene oxide and/or propylene oxide groups;

Carboxylates and their metal salts, including $C_{6-22}$ alkyl ether carboxylates and/or alkyl ethers containing ethylene oxide or propylene oxide groups;

Sulfates and their metal salts, including $C_{6-22}$ alkyl esters;

Sulfonates and their metal salts, including $C_{6-22}$ alkyl sulfo ethyl esters;

Alpha olefin sulfonates; and $C_{6-22}$ alkyl amino phosphonates.

The corrosion inhibitor compositions of the invention further comprise a quaternary ammonium compound. Representative examples of quaternary ammonium compounds include $C_{6-22}$ alkyl dimethyl amines (R—N(CH$_3$)$_2$) and $C_{6-22}$ dialkyl methyl amines (R$_2$—NCH$_3$) quaternized with suitable alkylating agents such as dimethyl sulphate, methyl chloride or benzyl chloride, as well as heterocyclic ammonium salts. Further examples of quaternary ammonium compounds are $C_{6-22}$ alkyl trimethyl ammonium (R—N$^+$(CH$_3$)$_3$) chloride or methosulphate, preferably $C_{10-18}$ alkyl trimethyl ammonium, $C_{6-22}$ dialkyl dimethyl ammonium (R$_2$—N$^+$(CH$_3$)$_2$) chloride or methosulphate, preferably $C_{10}$-$C_{18}$ dialkyl dimethyl ammonium, $C_{6-22}$ alkyl benzyl dimethyl ammonium chloride, quaternized alkylene polyamines (such as quaternized $C_{6-22}$ alkyl propylene diamines, quaternized $C_{6-22}$ alkyl propylene triamines or quaternized $C_{6-22}$ alkyl propylene tetraamines), N—$C_6$-$C_{22}$ alkyl pyridinium bromide or chloride (such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride), N-cyclohexyl pyridinium bromide, naphthyl methyl quinolinium chloride, $C_{6-22}$ alkyl methyl quinolinium chloride, naphthyl methylpyridinium chloride or $C_{6-22}$ alkyl methyl quinolinium chloride. Other examples of suitable quaternary ammonium compounds include alkyl quats, ester quats, polymeric quats, pyridine quats, benzyl quats and amido quats. Suitable amido quats include $C_{6-22}$ N,N,N-trimethyl monoalkyl propyl amido compounds, quaternised with suitable alkylating agents such as dimethyl sulphate, methyl chloride and the like.

Preferred corrosion inhibitor compositions of the present invention comprise one or more quaternary ammonium compounds selected from an alkyl quat, an ester quat, an amido quat, a pyridine quat, a benzyl quat, a polymeric quat or a bis ammonium quat.

Preferably the quaternary ammonium ammonium compound is an alkyl quat, an ester quat and/or a polymeric quat.

As used herein the term "polymeric quat" refers to a polymeric quaternary ammonium compound. Examples of suitable polymeric quats are disclosed in US2006/0062753, the contents of which are incorporated herein by reference.

Preferred polymeric quaternary ammonium compounds are salts of formula XX

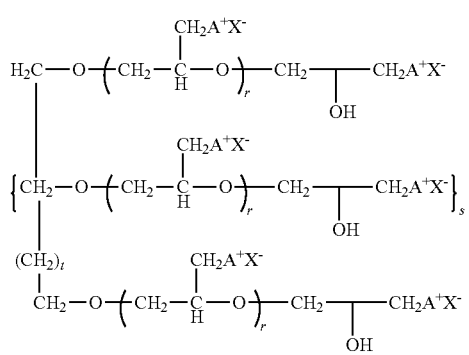

wherein each r is independently an integer from 3 to 150, preferably 6 to 42;

s is an integer from 0 to 10, preferably 1 to 7;

t is an integer from 0 to 10, preferably 0 or 1, e.g. 0;

A is an amino group; and $X^-$ is an anion, preferably halide, e.g. chloride or bromide.

Preferably the amine from which A derives is a tertiary amine. Examples of suitable amines include trimethyl amine, triethyl amine, dimethyl octyl, dimethyl dodecyl, dimethyl tetradecyl, diethyl hexadecyl, methyl ethyl octadecyl, dimethyl octadecyl, dimethyl octadecenyl, diethyl hexadecenyl, dodacylbenzyl methyl, decyl dibenzyl, dimethyl furyl, dimethyl phenyl, diethyl naphthyl, dicyclohexyl methyl and dimethyl cyclohexyl amines.

The polymeric quaternary ammonium salts are preferably prepared by first catalytically polymerizing an epihalohydrin in the presence of an alcohol monomeric compound having the general formula:

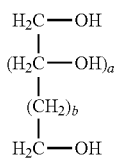

wherein a is an integer from 0 to 10, preferably 1 to 7 and b is an integer from 0 to 10, preferably 0 or 1, e.g. 0.

In this first step, the reaction proceeds to form an alcohol-epihalohydrin polymer mixture that typically has a polymer length of about 6-42 molecular size. In a second step, the alcohol-epihalohydrin polymer is reacted with tertiary amines to form the polymeric quaternary ammonium salts. A preferred epihalohydrin suitable for use is epichlorohydrin.

The tertiary amines are preferably represented by the formula

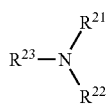

where $R^{21}$, $R^{22}$ and $R^{23}$ may or may not be the same and is a hydrocarbon group such as, for example, alkyl, cycloalkyl, aryl, alkenyl, alkynyl, heterocyclic and substituted derivatives of these. Alkyl groups include, for example, methyl, ethyl, propyl, butyl, amyl, hexyl, heptyl, octyl, nonyl, decyl, undecyl, dodecyl, tridecyl, eicosyl, docosyl and other similar alkyl groups having from between 1 and about 50 or more carbons, preferably between about 1 and about 30 carbons and more preferably between about 1 and 20 carbons. Alkenyl and alkynyl groups include unsaturated analogues of the alkyl groups that contain one or more double or triple carbon-carbon bond such as, for example, decenyl, dodecenyl, tridecenyl, tetradecenyl, pentadecenyl, hexadecyl, heptadecenyl, octadecenyl, octadienyl, octatrienyl, alkinyl and butynyl. The terms alkenyl and alkynyl also include isomers of the straight chain group, wherein branching occurs along the chain. Cycloalkyl groups are saturated ring compounds that include, for example, cyclopentyl, cyclohexyl, cycloheptyl, cyclooctyl and similar and further include substituted derivatives thereof such as, for example alkyl cyclohexyl and dialkyl cyclohexyl groups. Aryl groups are organic moieties derived from an aromatic compound by removal of one hydrogen and include, for example, phenyl, substituted phenyl, alkyl phenyl, polyalkylphenyl, chlorophenyl, alkoxyphenyl, naphthyl, alkyl naphthyl, benzyl and substituted derivatives of these.

Examples of tertiary amines include, but are not limited to, trimethyl amine, triethyl amine, dimethyl octyl, dimethyl dodecyl, dimethyl tetradecyl, diethyl hexadecyl, methyl ethyl octadecyl, dimethyl octadecyl, dimethyl octadecenyl, diethyl hexadecenyl, dodacylbenzyl methyl, decyl dibenzyl, dimethyl furyl, dimethyl phenyl, diethyl naphthyl, dicyclohexyl methyl and dimethyl cyclohexyl amines.

The alcohol monomer may be any primary, secondary or tertiary alcohol and is preferably a polyol such as, but are not limited to, glycol, glycerin, any tetritols, any pentitols, sorbitol, any hexitols, mannitol, dulcitol, pentaerythritol, dipentaerythritol, and tripentaerythritol. A preferred epihalohydrin is epichlorohydrin. The disclosed alcohols, epichlorohydrin and tertiary amines are commercially available and the usual commercial grades are suitable for the prepation of polymeric quaternary ammonium salts.

The polymeric quaternary ammonium salts described herein are highly biodegradable, thereby making these compounds highly desirable for use in corrosion inhibition compositions that require careful consideration concerning environmental impact, such as on offshore drilling platforms. The results of standard testing procedures used for determining biodegradability of these polymeric quaternary ammonium salts demonstrated that these salts were about 20% biodegraded after 7 days, about 95% biodegraded after 14 days and about 97% biodegraded after 28 days. For purposes of comparison, sodium benzoate was about 85.5% biodegraded after 7 days, about 95% biodegraded after 14 days and 100% biodegraded after 28 days.

Particularly preferably the quaternary ammonium compound is an alkyl quat and/or an ester quat. Some preferred compositions further comprise an alkyl quat. Other preferred compositions further comprise an ester quat. Still further preferred compositions comprise both an alkyl quat and an ester quat or both an ester quat and a polymeric quat.

As used herein, the term "alkyl quat" refers to an alkyl quaternary amine. As used herein the term "ester quat" refers to an alkyl quaternary esteramine. The term ester quat as used herein encompasses those compounds referred to in the art as reverse ester quats.

Preferred alkyl quats present in the compositions of the present invention include those of formula (VIII):

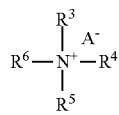

(VIII)

wherein each of $R^3$, $R^4$, $R^5$ and $R^6$ is a $C_{1-20}$ alkyl group and $A^-$ is a counter ion, preferably halide, sulphate, carbonate or bicarbonate.

In preferred alkyl quats each of $R^3$, $R^4$, $R^5$ and $R^6$ is a $C_{1-16}$ alkyl group, still more preferably a $C_{1-12}$ alkyl group, yet more preferably a $C_{1-3}$ alkyl group or a $C_{8-12}$ alkyl group. In preferred alkyl quats at least one of $R^3$, $R^4$, $R^5$ and $R^6$ is methyl. In other preferred alkyl quats at least one of $R^3$, $R^4$, $R^5$ and $R^6$ is decyl.

The term alkyl is used in relation to this formula as defined above in relation to formula (I).

A particularly preferred alkyl quat is a compound of formula (VIIIa):

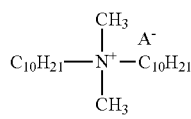

(VIIIa)

wherein $A^-$ is a counter ion, preferably halide, sulphate, carbonate or bicarbonate, especially carbonate or bicarbonate.

Suitable alkyl quats for use in the corrosion inhibitor compositions of the present invention are commercially available. For example, the compound of formula VIIIa wherein $A^-$ is carbonate and bicarbonate is commercially available.

In corrosion inhibitor compositions of the present invention that comprise a compound of formulae (II)-(VII) and an alkyl quat (e.g. an alkyl quat of formula VIII), the weight ratio of compound of formulae (II)-(VII) to alkyl quat should be selected according to the relevant application conditions, including water composition, oil composition, temperature and oil:water ratio. These variables are well known to a man skilled in the art. In one preferred embodiment, the weight ratio of compound of formulae (II)-(VII) to alkyl quat is preferably 10:1 to 0.1:1, more preferably 8:1 to 0.5:1, still more preferably 7:1 to 2:1, e.g. about 2.5:1.

Preferred ester quats present in the compositions of the present invention include those described in CA 2,273,268, EP-A-1718713 and EP-A-1806392, the entire contents of which are incorporated herein by reference.

Preferred ester quats present in the compositions of the present invention therefore include those of formula (IX):

(IX)

wherein $R^8$, $R^9$ and $R^{19}$ are each independently $C_{1-4}$ alkyl, $C_{1-4}$ hydroxyalkyl, $C_{6-12}$ aryl, alkylaryl containing 7 to 13 carbon atoms and a group corresponding to formula (X):

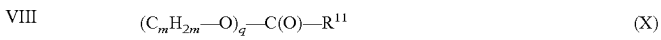

$(C_mH_{2m}—O)_q—C(O)—R^{11}$ (X)

wherein m is an integer selected from 2 or 3, q is an integer selected from 1 to 3 and $R^{11}$ is a $C_{7-23}$ alkyl or alkenyl group;

$R^7$ is a group corresponding to formula (X) or (XI):

(XI)

wherein $R^8$, $R^9$ and $R^{10}$ are as defined above, G is a group $—(CH_2)_p—$ or a group $—(CH_2)_p-E-CO-D-E-(CH_2)_p—$ wherein p is an integer of 1 to 6, E is NH or O and D is a dimer fatty acid residue containing on average 36 to 54 carbon atoms.

The terms alkyl and alkenyl are used in relation to this formula as defined above in relation to formula (I).

As used herein the term hydroxyalkyl group refers to an alkyl group to which a hydroxy (—OH) group is covalently bonded. The hydroxy group may be present at any position on the alkyl chain. Preferably, however, the hydroxy group is present at the end of the alkyl chain, i.e. in a terminal position.

As used herein the term aryl refers to any aromatic ring or aromatic ring system. Aryl groups may be substituted or unsubstituted but are preferably unsubstituted. The term aryl encompasses heteroaromatic rings and ring systems as well as aromatic rings and ring systems comprising solely of carbon ring atoms. Preferred aryl groups are non-heteroaromatic.

As used herein the term alkylaryl refers to a group comprising an alkyl group covalently bonded to an aryl group. A representative example of an alkylaryl group is benzyl (i.e. $CH_2Ph$). Preferred alkyl and aryl groups present in alkylaryl groups are the same as those defined above for alkyl and aryl.

In preferred compounds of formula (IX), $R^7$ is a group of formula (X). These compounds are technically quaternised mono-, di- or tri-fatty acid amine ester compounds which can be obtained by known synthetic methods. Compounds containing one and preferably two fatty acid ester groups are preferably used. The quaternised compounds may be obtained, for example, by esterification of tertiary mono-, di, or tri-alkanolamines, preferably triethanolamine or triisopropanol amine, with fatty acid chlorides and subsequent quaternisation of the esters formed with methyl chloride, benzyl chloride or dimethyl sulphate.

Preferred ester quats present in the compositions of the present invention include those of formula (IXa):

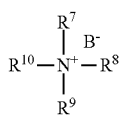

IXa wherein R[7] is $(C_mH_{2m}—O)_q—C(O)—R^{11}$ wherein m is an integer selected from 2 or 3, q is an integer selected from 1 to 3 and $R^{11}$ is a $C_{7-23}$ alkyl or alkenyl group;

$R^8$, $R^9$ and $R^{19}$ are each independently selected from $C_{1-4}$ alkyl, $C_{1-4}$ hydroxyalkyl, $C_{6-12}$ aryl, alkylaryl containing 7 to 13 carbon atoms and a group $R^7$; and B[−] is an anion.

In preferred ester quats $R^8$, $R^9$ and $R^{19}$ are each independently selected from $C_{1-6}$ alkyl, $C_{1-6}$ hydroxyalkyl and a group $R^7$, particularly from $C_{1-6}$ hydroxyalkyl and a group $R^7$. Preferred hydroxyalkyl groups include hydroxyethyl (i.e. —CH$_2$CH$_2$OH) and hydroxypropyl (—CH$_2$CH$_2$CH$_2$OH). In particularly preferred ester quats at least one of $R^8$, $R^9$ and $R^{10}$ is a $R^7$ group.

In further preferred ester quats of formula (IX) $R^{11}$ is a $C_{9-21}$ alkyl or alkenyl group, more preferably a $C_{11-19}$ alkyl or alkenyl group, still more preferably a $C_{13-17}$ alkyl or alkenyl group, e.g. a $C_{15-17}$ alkenyl group.

When $R^{11}$ is an alkenyl group, it may comprise 1, 2 or 3 double bonds, particularly 1 double bond. The double bond(s) may be present at any position within the alkenyl chain. When counting the position of the double bond(s) the oxo carbon is counted as position 1.

In compounds of formula (IX) B[−] is a counter ion. It may be, for example, a halide (such as Cl[−] or Br[−]), a sulphate or a phosphate. Particularly preferably B[−] is a halide anion or a sulfate anion, especially a sulfate anion. Especially preferably B[−] is a $C_{1-6}$ alkyl sulfate anion such as methyl sulfate (CH$_3$OSO$_3^-$) or ethyl sulfate (CH$_3$CH$_2$OSO$_3^-$). Especially preferably B[−] is methyl sulfate.

Suitable ester quats for use in the corrosion inhibitor compositions of the present invention are commercially available.

In corrosion inhibitor compositions of the present invention that comprise a compound of formulae (II)-(VII) and an ester quat (e.g. an ester quat of formula (IX)), the weight ratio of compound of formulae (II)-(VII) to ester quat should be selected according to the relevant application conditions, including water composition, oil composition, temperature and oil:water ratio. These variables are well known to a man skilled in the art. In one embodiment, the weight ratio of compound of formulae (II)-(VII) to ester quat is preferably 10:1 to 0.1:1, preferably 5:1 to 0.1:1, more preferably 1:1 to 0.1:1, still more preferably 0.5:1 to 0.1:1 e.g. about 0.25:1.

The corrosion inhibitor compositions of the present invention further comprise a carrier, particularly a liquid carrier. Thus the compositions may be in the form of a solution or a dispersion/emulsion, e.g. where particles containing or comprising the compounds or compositions of the present invention are dispersed as a colloid or suspension in a continuous phase having a different composition. It is envisaged that the compositions of the present invention may also be in different forms, for example, they may be oil-miscible, water-miscible, oil-water dispersions, water-oil dispersions or present in the form of an emulsion of any type. Preferably, however, the composition is in the form of a solution.

The liquid carrier may be aqueous (e.g. water) or non-aqueous, but is preferably non-aqueous. Alternatively the carrier may be a mixture of an aqueous (e.g. water) and non-aqueous solvents. Preferred non-aqueous carriers include $C_{1-8}$ alcohols such as methanol, ethanol, isopropanol, isobutanol, hexanol or 2-ethyl hexanol; glycols such as ethyleneglycol, di-ethyleneglycol, propyleneglycol, ethyl diglycol, butyldiglycol, dipropylene glycol, ethylene glycol monobutyl ether (EGMBE) and the like, or mixtures thereof. Other suitable carriers include hydrocarbon distillates, fatty acid esters and carbonic acid esters, phenyl esters, $C_{9-12}$ aromatics and turpenes. Preferably the carrier is a glycol, especially butyl diglycol.

The skilled man will readily be able to determine suitable amounts of each of compounds of formulae (II)-(VII) and quaternary ammonium compound (e.g. if present alkyl quat (e.g. of formula (VIII)) and ester quat (e.g. of formula (IX))) for incorporation into the compositions of the present invention. Correspondingly the skilled man will readily be able to determine a suitable amount of carrier for use in the compositions of the present invention. Thus the compositions in a ready to use form preferably comprise the carrier in an amount from 0.5 to 99.5 weight %, more preferably between 5 and 60 weight %, even more preferably between 40 and 60 weight %, e.g. about 50 weight %.

The compositions of the present invention may also comprise other compounds known in the art of corrosion inhibition, particularly for corrosion inhibition in hydrocarbon producing systems. The compositions of the invention, for example, preferably comprise a sulphur-containing species such as a thiosulphate salt, 2-mercaptoethanol, thioglycolic acid or a $C_{1-6}$ alkyl thiol. Particularly preferred compositions comprise sodium thiosulphate or 2-mercaptoethanol. When present, the weight ratio of compounds of formulae (II)-(VII) and quaternary ammonium compound (e.g. if present alkyl quat (e.g. of formula (VIII)) and ester quat (e.g. of formula (IX))) to the sulphur-containing species should be from 100:1 to 0.1:1, more preferably from 20:1 to 5:1, e.g. about 10:1.

The corrosion inhibitor compositions of the present invention may also comprise wetting agents, stability aids, agents to increase or decrease the partition of components between phases, demulsifiers and/or anti-foaming agents. Examples of suitable compounds include sulfo-succinates, alkyl ether carboxylates (or salts), alkyl ether alcohols, ethoxylated fatty acid esters, ethoxylated fatty acid amines and ethoxylated fatty acid amides. Furthermore, the corrosion inhibitor compositions of the present invention may comprise other additives, particularly those useful in hydrocarbon recovery or transportation. Examples of such additives include scale inhibitors, gas hydrate inhibitors, wax inhibitors, paraffin inhibitors, thickeners, diversion agents, pH modifiers and/or catalysts.

The corrosion inhibitor compositions of the present invention may be prepared using conventional techniques and equipment. Thus a method of making a corrosion inhibitor composition as hereinbefore defined comprises mixing a carrier, a compound of formulae (II)-(VII) and a quaternary ammonium compound as hereinbefore defined. The mixing may be achieved using any standard mixing or blending equipment. In principle, the mixing may be carried out in any order. Thus carrier may be introduced into the mixer followed by the corrosion inhibitor compounds (i.e. a compound of formulae (II)-(VII) and a quaternary ammonium compound as hereinbefore defined) or vice versa. However, in other cases, the carrier and the corrosion inhibitor compounds may have to be added in a specific order. If necessary the skilled man will readily be able to determine a suitable order of addition. It is also envisaged that the corrosion inhibitor compositions of the invention may be prepared and supplied in a concentrated form. Thus the amount of carrier used in the preparation of the corrosion inhibitor composition may not be the amount required to provide the composition at its in use concentration. Rather the amount of carrier may be significantly less and hence the concentration of the corrosion inhibitor compounds in the composition be significantly higher. The end user of the composition is readily able to dilute the concentrated composition to a suitable concentration.

Accordingly the present invention also concerns kits for the preparation of corrosion inhibitor compositions of the present invention. Such kits provide the corrosion inhibitor compounds of the invention (e.g. compounds of formulae (II)-(VII) and a quaternary ammonium compound as hereinbefore defined) and any other compounds present, e.g. sulphur-containing compounds as hereinbefore defined.

Preferred kits of the present invention therefore comprise:
(i) a first container comprising a compound of formula (II)-(VII) as hereinbefore defined;
(ii) a second container comprising an alkyl quat, an ester quat and/or a polyermic quat as hereinbefore defined; and
(iii) instructions for preparation of the corrosion inhibitor composition.

Further preferred kits may comprise a carrier. The carrier may be provided in one or more of the afore-mentioned containers or the carrier may be provided in a separate container. Alternatively the carrier may be available on site, e.g. locally available water, brine or solvent as hereinbefore defined.

Further preferred kits may comprise a sulphur-containing compound. The sulphur-containing compound may be provided in one or more of the afore-mentioned containers or the sulphur-containing compound may be provided in a separate container.

Further compounds that may be present in the corrosion inhibitor compositions of the present invention, such as surfactants, may be provided in any of the first, second or third containers or may alternatively be provided in additional separate containers.

The corrosion inhibitor compositions of the present invention may be used to reduce, inhibit or prevent corrosion of a metal surface in any water-containing system. For instance the corrosion inhibitor compositions of the present invention may be used to reduce, inhibit or prevent corrosion in boilers, coolers, scrubbers, heat transfer systems, fluid processing vessels and transport pipes. Preferably, however, the system comprises water and hydrocarbon, e.g. is a hydrocarbon producing system (e.g. pipework, drilling equipment, measuring or detection equipment etc), hydrocarbon transportation system (e.g. pipework, valves, filters, etc) or hydrocarbon refinery system (e.g. tanks, pipes, sieves, equipment etc).

Within a water-containing system, the media to which the metallic surfaces are exposed may be a liquid or a gas, including liquid/liquid or liquid/gaseous multiphase systems. The liquid phase can be purely aqueous, non-aqueous (for example crude oil) and, more often, a water/oil mixture or emulsion. The media to which the metallic surfaces are exposed may also be a slurry.

In order to address these different conditions, the methods by which the compositions of the present invention are deployed may be varied. The compositions of the present invention may also be used alone or in combination with other agents or compositions.

The amount of composition of the present invention that is required to prevent or inhibit corrosion, or to reduce it to an acceptable level, varies according to the system in which it is used. Methods for assessing and monitoring the effectiveness of treatments in different systems are well known by those skilled in the art. Most generally, the compositions of the invention must be added to the system at an appropriate concentration. The composition is also preferably added at a point in the system that is upstream of the locations at which corrosion inhibition is required or most required.

The compositions of the present invention may be deployed in methods of inhibiting, preventing or reducing corrosion by several different techniques. Representative examples include: (i) placement into a sump, cavity or annulus; (ii) placement into a pipe or pipeline, e.g. as part of a hydrotest operation; (iii) by continuous injection, e.g. into a pipeline, via a pump; (iv) by batch treatment, including the treatment of equipment and pipelines and (v) by direct treatment of valuable devices (fittings, valves, tubes, pipelines etc). The compositions of the invention may generally be used in batch, intermittent or continuous treatment methods.

When used in a batch treatment by placement in a sump, cavity or annulus or when placed into a pipe or pipeline as part of a hydrotest operation, the effective concentration of compounds of formulae (II)-(VII) can range from 0.1 to 50% w/w concentration, more preferably from 0.1 to 15% w/w concentration and still more preferably from 0.1 to 5%, based on the total volume of the sump, cavity, annulus or pipeline.

When used in a continuous injection via a pump, the effective concentration of compounds of formulae (II)-(VII) can range from 1 to about 5000 parts per million by weight (ppm), more preferably from 1 to about 500 ppm and more preferably still from 1 to about 250 ppm, based on total fluids and also taking into account the flow rate of the main fluid stream. Other treatments that might be carried out by continuous injection include treatment into flow lines, gathering lines, by-pass loops and headers.

Preferably, however, the treatment methods of reducing, inhibiting or preventing corrosion of the present invention are applied to a hydrocarbon producing system. The term "hydrocarbon producing system" is used herein to encompass the subterranean formation (e.g. rock) from which hydrocarbon is extracted as well as the equipment used in the extraction process. The formation may contain oil or gas, although the method is particularly suitable for treatment of oil wells. The metal surface may be the surface of any equipment used, including subsurface and surface equipment (e.g. tubes, pipes, pumps, valves, nozzles, storage containers, screens etc). In a preferred embodiment of the present invention the corrosion of hydrocarbon recovery, transportation and refining equipment is reduced, inhibited or prevented using the compositions hereinbefore defined.

The present invention will now be described with reference to the following non-limiting examples and Figures wherein.

EXAMPLES

Methods

Figure 1:
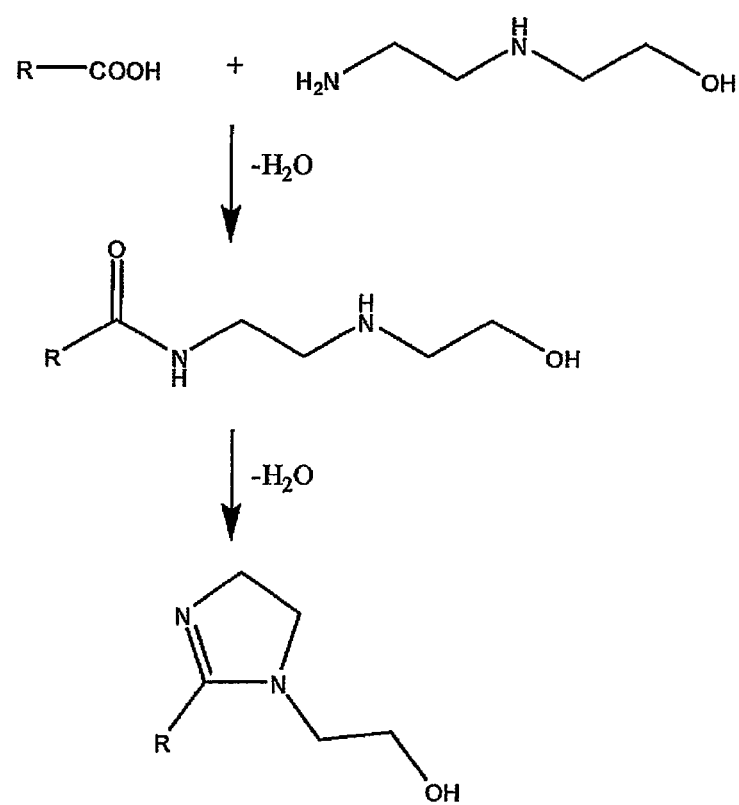
FIG. 1 shows a synthetic scheme for the preparation of compounds of formula (I)
Figure 2:
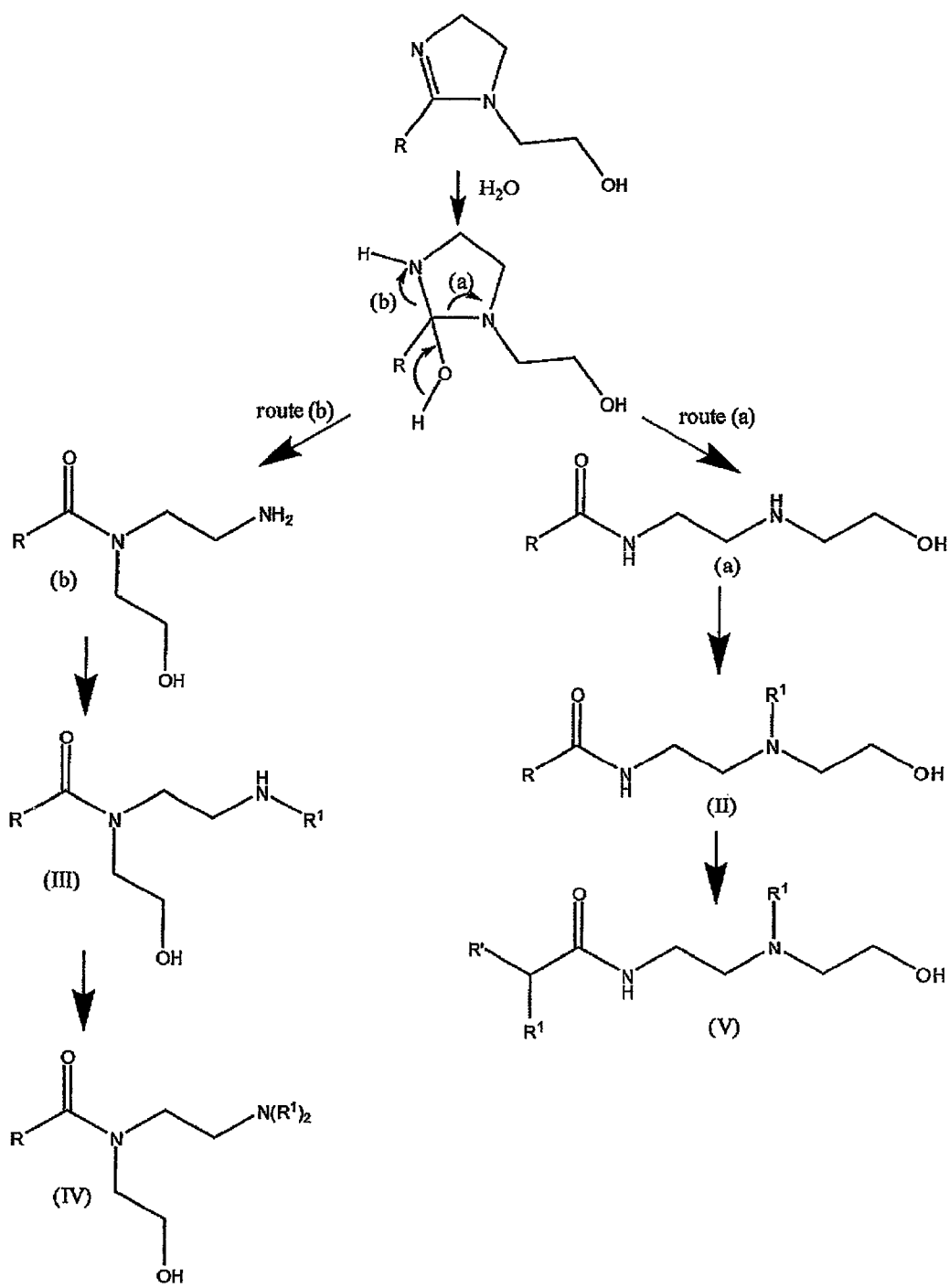
FIG. 2 shows a synthetic scheme for the preparation of compounds of formulae (II)-(V)

Toxicity ($EC_{50}$) was measured by a standard test: ISO 10253 1998 water quality—marine algal growth inhibition test with *Skeletonema costatum*.

The corrosion inhibition (CI) performance of compounds and compositions of the invention and the performance of comparative examples was tested by means of Linear Polarisation Resistance (LPR) Bubble test measurements.

In general, the LPR Bubble test method uses a test cell, typically made from glass, which is fitted with a probe containing electrodes which are connected to an electrochemical measurement system and associated software. The cell is also fitted with a gas inlet and frit to allow constant purging with $CO_2$ gas. The cell can be loaded with test fluids, typically brine or a combination of brine and a suitable oil phase. The liquids may be stirred, typically at low or moderate speeds, or may be static. The instantaneous rate of corrosion can be measured throughout the experiment by means of the electrochemical probe which extends into the water phase. Other experiments, such as a cyclic sweep, or cyclic polarisation measurement, can also be performed.

In our experiments, the LPR cells were loaded with 95 parts of water (brine) and 5 parts kerosene. Two types of water composition were used, identified as Brine A and Brine B, details of which are given in Table 1. The test temperature was 50° C. in all experiments, while details of the water phase pH values relevant to each water composition are given in this Table. The cells were continuously purged with $CO_2$ gas and a stirring speed of 100 rpm was used.

To perform the test, the electrode was allowed to pre-corrode for 2 hours, after which a test corrosion inhibitor composition was added to the kerosene phase. The test was then continued for a total of approximately 14 hours. The data from the LPR electrochemical probe was obtained at regular intervals and used to calculate the corrosion rate in millimeters per year (mmpy) versus time and also the final % inhibition, given by: % inhibition=100−100*final corrosion rate/initial corrosion rate.

At the completion of the corrosion rate measurements, the apparatus was used to perform a cyclic sweep, or cyclic polarisation test. In this measurement, the electrode potential is increased at a constant rate up to a maximum of ~250 mV, while monitoring the current density. A significant increase in current density is taken to indicate an increase in corrosion, i.e. the breakdown of the protective film involving the test corrosion inhibitor. In the following Tables, the columns of data headed 'Cyclic Sweep, show the potential in mV at which the current density was observed to increase above 1 $mA/cm^2$ during the forward scan. In general, a higher value for this parameter indicates a greater resistance to film breakdown.

Further details of experimental variables are given per the examples. Details of the brine compositions and water phase pH values are given in Table 1 below.

TABLE 1

| Component | Brine A (g/L) | Brine B (g/L) |
|---|---|---|
| NaCl | 74.13 | 10 |
| $MgCl_2 \cdot 6H_2O$ | 4.21 | |
| KCl | 0.71 | |
| $CaCl_2 \cdot 6H_2O$ | 17.19 | |
| $SrCl_2 \cdot 6H_2O$ | 0 | |

TABLE 1-continued

| Component | Brine A (g/L) | Brine B (g/L) |
|---|---|---|
| $BaCl_2 \cdot 2H_2O$ | 0 | |
| $NaHCO_3$ | 0.68 | |
| $Na_2SO_4$ | 0.02 | |
| NaOAc | 0 | |
| TDS (mg/L) | 86,226 | 10,000 |
| Water phase pH | 5.5 | 3.9 |

Chemicals

Compounds of Formula (II)-(VII)

Compounds of formula (II)-(VII) (amphoacetates, diacetates and amphosulfonates) were obtained from commercial sources, synthesised by Champion Technologies, or prepared on behalf of Champion Technologies for the purposes of these experiments.

Samples of Na Oleyl amphoacetate were prepared by, or on behalf of, Champion Technologies.

Samples of Mixture A, Mixture B and Mixture C were obtained commercially. The composition of Mixture C has been described above.

Mixtures A and B are commercially available from Rhodia under the trade names Miranol BM Conc and Miranol Ultra C-32 respectively. It is understood that these are a mixture of compounds of the following formulae:

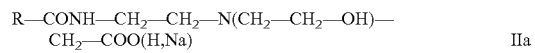

IIa

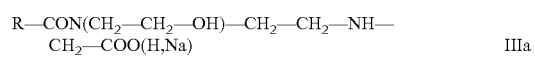

IIIa wherein R is as follows—

C11 in BM Conc (Na Lauryl amphoacetate CAS68608-66-2)

C11-13 in Miranol Ultra C-32 (Na Coco amphoacetate CAS 68334-21-4. The coco alkyl comprises approximately 13% $C_{8-10}$ alkyl, 45-55% $C_{1-2}$ alkyl, 25% $C_{1-4}$ alkyl, 14% $C_{1-6}$ alkyl and <12% $C_{1-8}$ alkyl).

Ester Quat

Samples of the preferred ester quat were prepared by, or on behalf of, Champion technologies, or obtained commercially.

One ester quat has the general formula IX as described previously and is referred to as Mixture D below.

Another preferred ester quat is obtained commercially from Kao Corporation under the tradename Tetranyl AO-1 (CAS 94095-35-9). It is an oleyl triethanolamine ester quat. It is referred to as Mixture F in the results below.

Alkyl Quat

Samples of the preferred alkyl quat were obtained commercially. The composition of this product has been described previously and is referred to as Mixture E below.

Mixture E is commercially available from Lonza under the tradename Carboshield 1000. It is a di-decyl, di-methyl quat of the following structure:

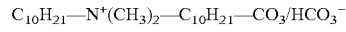

Results

Toxicity Data for Amphoacetates and Diacetates

The toxicity of various amphoacetates and diacetates present in the compositions of the current invention towards marine algae (*Skeletonema costatum*) was tested and the data are presented in Table 2 below. The results show that Na lauryl amphoacetate exhibits a value for $EC_{50}$>10 mg/L, while data for the longer chain length variants are all <10 mg/L. The results also suggest the possibility that di-sodium di-acetates may also meet the requirement for $EC_{50}>10$ mg/L provided derivatives are prepared with an appropriate alkyl chain length.

The toxicity of three comparative compounds was also tested and the data are additionally presented in Table 2. Coco benzyl quat and coco hydroxyethyl imidazoline are both examples of traditional ingredients of known corrosion inhibitor compositions. Both compounds are toxic ($EC_{50}$ to *S. costatum* <0.5 mg/L). The data for $C_8$-$C_{10}$ hydroxyethyl imidazoline were obtained in order to test the toxicity of a shorter chain hydroxyethyl imidazoline. It can be seen that this compound is also toxic to *S. costatum*.

TABLE 2

| Alkyl type | Representative alkyl chain length (including C=O) | Algae toxicity ($EC_{50}$) mg/L |
|---|---|---|
| Na Amphoacetates | | |
| Lauryl | 12 | 30 |
| Coco | 12-14 | 2.2 |
| Myristil | 14 | 0.98 |
| Oleyl | 18:1 | 2.0 |
| Di sodium Di-Acetates | | |
| Coco | 12-14 | 6.7 |
| *Comparative examples | | |
| Coco benzyl quat | | 0.19 |
| Coco hydroxyethyl imidazoline | | <0.1 mg/L |
| $C_8$-$C_{10}$ hydroxyethyl imidazoline | | <0.1 mg/L |

Example 1

CI Performance Data for Selected Amphoacetates and Amphosulfonates in the Absence of a Quaternary Ammonium Compound Tables 3a and 3b show the results obtained for 3 amphoacetates, one amphosulfonate and two of the comparative compounds in LPR bubble test experiments using the two brine compositions (A and B) described above. In each of these experiments, the component under test was first prepared as a solution containing 40% dry-weight of the test chemical in a mixture of 50:50 isopropanol: water. 50 parts by weight of this solution was then combined with a further 45 parts by weight of 50:50 isopropanol: water and 5 parts by weight of an aqueous solution containing 40 parts by weight of sodium thiosulfate. Following a 2 hour pre-corrosion stage, the combined pre-blend was then added to the kerosene phase of the LPR Bubble Test apparatus using an addition rate calculated to provide 10 parts per million (ppm) of the test chemical, as a proportion of total fluids (kerosene plus water). All other details of the experiment are as described previously.

TABLE 3a

Corrosion inhibition by amphoacetates and amphosulphonates alone

| | Brine A | | | |
|---|---|---|---|---|
| | Initial corrosion rate (mmpy) | Final corrosion rate (mmpy) | % Inhibition | Cyclic sweep |
| Mixture A (Na Lauryl amphoacetate) | 4.04 | 0.057 | 98.59 | 77 |

TABLE 3a-continued

Corrosion inhibition by amphoacetates and amphosulphonates alone

| | Brine A | | | |
|---|---|---|---|---|
| | Initial corrosion rate (mmpy) | Final corrosion rate (mmpy) | % Inhibition | Cyclic sweep |
| Mixture B (Na Coco amphoacetate) | 3.81 | 0.036 | 99.06 | 84 |
| Na Oleyl amphoacetate | 3.67 | 0.12 | 96.81 | 81 |
| Mixture C (Na Lauryl amphohydroxypropyl sulfonate) | 3.90 | 0.024 | 99.39 | 84 |
| * Coco benzyl quat | 3.66 | 0.005 | 99.9 | 140 |
| * $C_8$-$C_{10}$ hydroxyethyl imidazoline | 3.86 | 0.117 | 97.0 | 64 |

* Comparative examples

TABLE 3b

Corrosion inhibition by amphoacetates and amphosulphonates alone

| | Brine B | | | |
|---|---|---|---|---|
| | Initial corrosion rate (mmpy) | Final corrosion rate (mmpy) | % Inhibition | Cyclic sweep |
| Mixture A (Na Lauryl amphoacetate) | 3.66 | 0.43 | 88.42 | 125 |
| Mixture B (Na Coco amphoacetate) | 3.87 | 0.22 | 94.39 | 125 |
| Na Oleyl amphoacetate | 3.56 | 0.00014 | >99.99 | 250 |
| Mixture C (Na Lauryl amphohydroxypropyl sulfonate) | 3.81 | 0.11 | 97.18 | 157 |

The results in Tables 3a and 3b show that each of the amphoacetates and amphosulfonates shows useful corrosion inhibition performance for either one or both brines. Na oleyl amphoacetate can be seen to show particularly good performance versus brine B. Notably the compounds show generally comparable corrosion inhibition performance to the traditional comparative compounds, but have the significant advantage of being less environmentally toxic.

Table 4 shows the results for an amphoacetate, Mixture A and a preferred ester quat (Mixture D) and also for corrosion inhibitor compositions of the present invention comprising Mixture A and the preferred Ester quat (Mixture D) using Brine A. In each of these experiments, the test chemical or corrosion inhibitor blend were prepared in solution in 50:50 isopropanol: water with Na thiosulphate and were added to the kerosene phase to give the equivalent of 10 ppm active as described previously.

TABLE 4

| | Brine A | | | |
|---|---|---|---|---|
| | Initial corrosion rate (mmpy) | Final corrosion rate (mmpy) | % Inhibition | Cyclic sweep |
| Mixture A | 4.04 | 0.057 | 98.6 | 77 |
| Mixture D | 3.86 | 0.008 | 99.8 | 127 |
| 3:1 Mixture A:Mixture D | 4.13 | 0.003 | >99.9 | 158 |
| 1:1 Mixture A:Mixture D | 3.72 | 0.002 | >99.9 | 147 |
| 0.33:1 Mixture A:Mixture D | 4.25 | 0.005 | >99.9 | 198 |
| 0.25: Mixture A:Mixture D | 4.05 | 0.002 | >99.9 | 250 |

The results from these experiments show that Mixture A: Ester quat blends show improved performance, particularly a reduction in final corrosion rate and an increase in cyclic sweep performance, compared to either component when used on their own. Notably the blend shows synergy in all compositions tested. The results obtained for these blends can also be seen to be comparable, or superior, to the results obtained using the same methodology for samples of traditional chemistries, e.g. coco benzyl quat and coco hydroxyethyl imidazoline, as shown in Table 3a.

Table 5 shows the results for an amphoacetate, Mixture A and a preferred alkyl quat (Mixture E) and also for corrosion inhibitor compositions comprising Mixture A and Mixture E using Brine A. In these experiments, Mixture A and Mixture E were prepared in solution in 50:50 isopropanol: water with Na thiosulphate and were added to the kerosene phase to give the equivalent of 10 ppm active as described previously. The compositions containing Mixture A and Mixture E were prepared as solutions in a mixed solvent system and also contained an ethoxylated fatty acid ester and Na thiosulfate. The total weight of Mixture A and Mixture E was approximately 30% in each case, but varied slightly. The weight % of the ethoxylated fatty acid ester and Na thiosulfate was kept the same in all cases. The quantity of the corrosion inhibitor formulation added to the kerosene phase was also varied slightly, but was calculated to give an equivalent of 10 parts per million (ppm) taking into account the dry weights of Mixture A, Mixture E, the ethoxylated fatty acid ester and Na thiosulfate, respectively. All other details of the experiments are as described previously.

TABLE 5

| | Brine A | | | |
|---|---|---|---|---|
| | Initial corrosion rate (mmpy) | Final corrosion rate (mmpy) | % Inhibition | Cyclic sweep |
| Mixture A | 4.04 | 0.057 | 98.6 | 77 |
| Mixture E | 3.78 | 0.009 | 99.8 | 104 |
| 7:1 Mixture A:Mixture E | 3.76 | 0.003 | >99.9 | 174 |
| 2.5:1 Mixture A:Mixture E | 3.94 | 0.0001 | >99.9 | 243 |
| 1.5: Mixture A:Mixture E | 4.05 | 0.002 | >99.9 | 215 |
| 0.8:1 Mixture A:Mixture E | 3.85 | 0.004 | >99.9 | 162 |
| 0.3: Mixture A:Mixture E | 3.79 | 0.007 | 99.8 | 128 |

The results presented as Table 5 show both a low final corrosion rate and good cyclic sweep performance, particularly for Mixture A: Mixture E compositions containing between 7:1 and 1.5:1 Mixture A: Mixture E. Notably the blend shows synergy in all compositions tested

Example 2

Each of the compositions described below were prepared. All compositions contain solvents—water, methylethylene glycol (MEG), ethylene glycol monobutyl ether (EGMBE) and/or ethylene diglycol (EDG) and are adjusted to contain approximately 20% wt corrosion inhibitor in each case. The proportion of amphoacetate to ammonium quaternary compound is generally 1:1 by weight except in GR285060-03 which contains approximately 1.75:1 amphoacetate to quaternary ammonium compound respectively. Unless otherwise stated, all of the compositions contain approximately 1.9 wt % of sulfur-containing compound.

| GR285043-01 | | | | |
|---|---|---|---|---|
| Component | Generic | Wt % | Wt (20 g) | Activity (Equiv) |
| MEG | Solvent | 33.00 | 6.60 | 0.00 |
| EGMBE | Solvent | 11.00 | 2.20 | 0.00 |
| Mixture A | Amphoacetate | 41.00 | 8.20 | 17.63 |
| Water | Solvent | 11.00 | 2.20 | 0.00 |
| Na2S2O3 (47% soln) | Sulfur-compound | 4.00 | 0.80 | 1.88 |
| | | 100.00 | 20.00 | 19.51 |

| GR285043-02 | | | | |
|---|---|---|---|---|
| Component | Generic | Wt % | Wt (20 g) | Activity (Equiv) |
| MEG | Solvent | 33.00 | 6.60 | 0.00 |
| EGMBE | Solvent | 11.00 | 2.20 | 0.00 |
| Mixture A | Amphoacetate | 46.00 | 9.20 | 19.78 |
| Water | Solvent | 10.00 | 2.00 | 0.00 |
| Na2S2O3 (47% soln) | Sulfur-compound | 0.00 | 0.00 | 0.00 |
| | | 100.00 | 20.00 | 19.78 |

| GR285043-03 | | | | |
|---|---|---|---|---|
| Component | Generic | Wt % | Wt (20 g) | Activity (Equiv) |
| MEG | Solvent | 33.00 | 6.60 | 0.00 |
| EGMBE | Solvent | 11.00 | 2.20 | 0.00 |
| Mixture A | Amphoacetate | 21.00 | 4.20 | 9.03 |
| Mixture E | Di-alkyl quat | 16.00 | 3.20 | 8.96 |
| Ethylene Diglycol | Solvent | 15.00 | 3.00 | 0.00 |
| Na2S2O3 (47% soln) | Sulfur-compound | 4.00 | 0.80 | 1.88 |
| | | 100.00 | 20.00 | 19.87 |

| GR285043-04 | | | | |
|---|---|---|---|---|
| Component | Generic | Wt % | Wt (20 g) | Activity (Equiv) |
| MEG | Solvent | 33.00 | 6.60 | 0.00 |
| EGMBE | Solvent | 11.00 | 2.20 | 0.00 |
| Mixture A | Amphoacetate | 21.00 | 4.20 | 9.03 |

-continued

GR285043-04

| Component | Generic | Wt % | Wt (20 g) | Activity (Equiv) |
|---|---|---|---|---|
| Mixture D | EQ | 11.00 | 2.20 | 9.13 |
| Water | Solvent | 20.00 | 4.00 | 0.00 |
| Na2S2O3 (47% soln) | Sulfur-compound | 4.00 | 0.80 | 1.88 |
| | | 100.00 | 20.00 | 20.04 |

GR285052-01

| Component | Generic | Wt % | Wt (20 g) | Activity (Equiv) |
|---|---|---|---|---|
| MEG | Solvent | 33.00 | 6.60 | 0.00 |
| EGMBE | Solvent | 11.00 | 2.20 | 0.00 |
| Mixture E | Di-alkyl quat | 32.00 | 6.40 | 17.92 |
| Water | Solvent | 20.00 | 4.00 | 0.00 |
| Na2S2O3 (47% soln) | Sulfur-compound | 4.00 | 0.80 | 1.88 |
| | | 100.00 | 20.00 | 19.80 |

GR285052-04

| Component | Generic | Wt % | Wt (20 g) | Activity (Equiv) |
|---|---|---|---|---|
| MEG | Solvent | 33.00 | 6.60 | 0.00 |
| EGMBE | Solvent | 11.00 | 2.20 | 0.00 |
| Mixture B | Amphoacetate | 21.00 | 4.20 | 9.03 |
| Mixture E | Di-alkyl quat | 16.00 | 3.20 | 8.96 |
| Ethylene Diglycol | Solvent | 15.00 | 3.00 | 0.00 |
| Na2S2O3 (47% soln) | | 4.00 | 0.80 | 1.88 |
| | | 100.00 | 20.00 | 19.87 |

GR285052-07

| Component | Generic | Wt % | Wt (20 g) | Activity (Equiv) |
|---|---|---|---|---|
| EGMBE | Solvent | 33.00 | 6.60 | 0.00 |
| MEG | Solvent | 11.00 | 2.20 | 0.00 |
| Mixture F | EQ | 22.00 | 4.40 | 18.26 |
| Water | Solvent | 30.00 | 6.00 | 0.00 |
| Na2S2O3 (47% soln) | Sulfur-compound | 4.00 | 0.80 | 1.88 |
| | | 100.00 | 20.00 | 20.14 |

GR285060-03

| Component | Generic | Wt % | Wt (20 g) | Activity (Equiv) |
|---|---|---|---|---|
| EGMBE | Solvent | 39.00 | 7.80 | 0.00 |
| MEG | Solvent | 13.00 | 2.60 | 0.00 |
| Mixture B | Amphoacetate | 27.00 | 5.40 | 11.61 |
| Mixture F | EQ | 8.00 | 1.60 | 6.64 |
| Water | Solvent | 9.00 | 1.80 | 0.00 |
| Na2S2O3 (47% soln) | Sulfur-compound | 4.00 | 0.80 | 1.88 |
| | | 100.00 | 20.00 | 20.13 |

Figure 3:
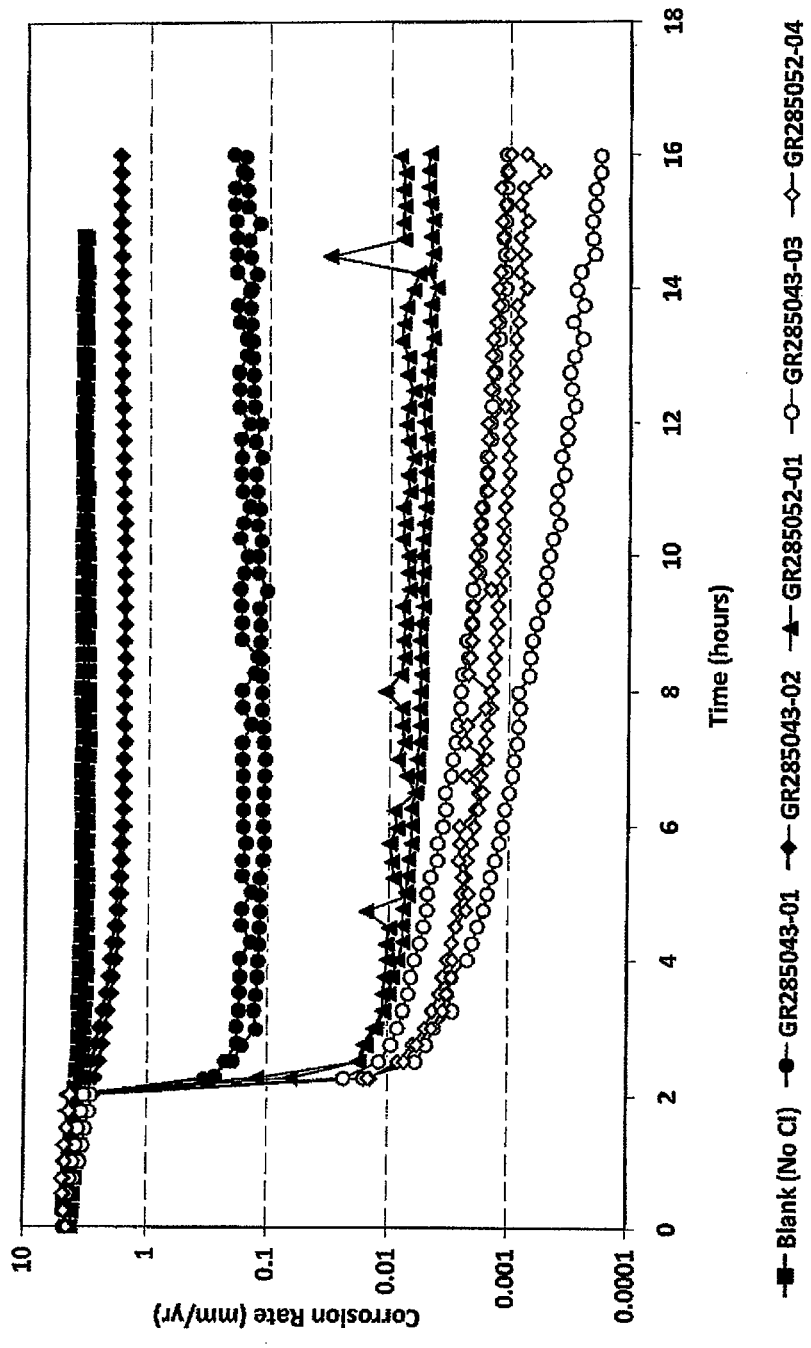
FIGS. 3 and 4 each show the performance of compositions of the invention versus comparative compositions in a corrosion inhibition test.
Figure 4:
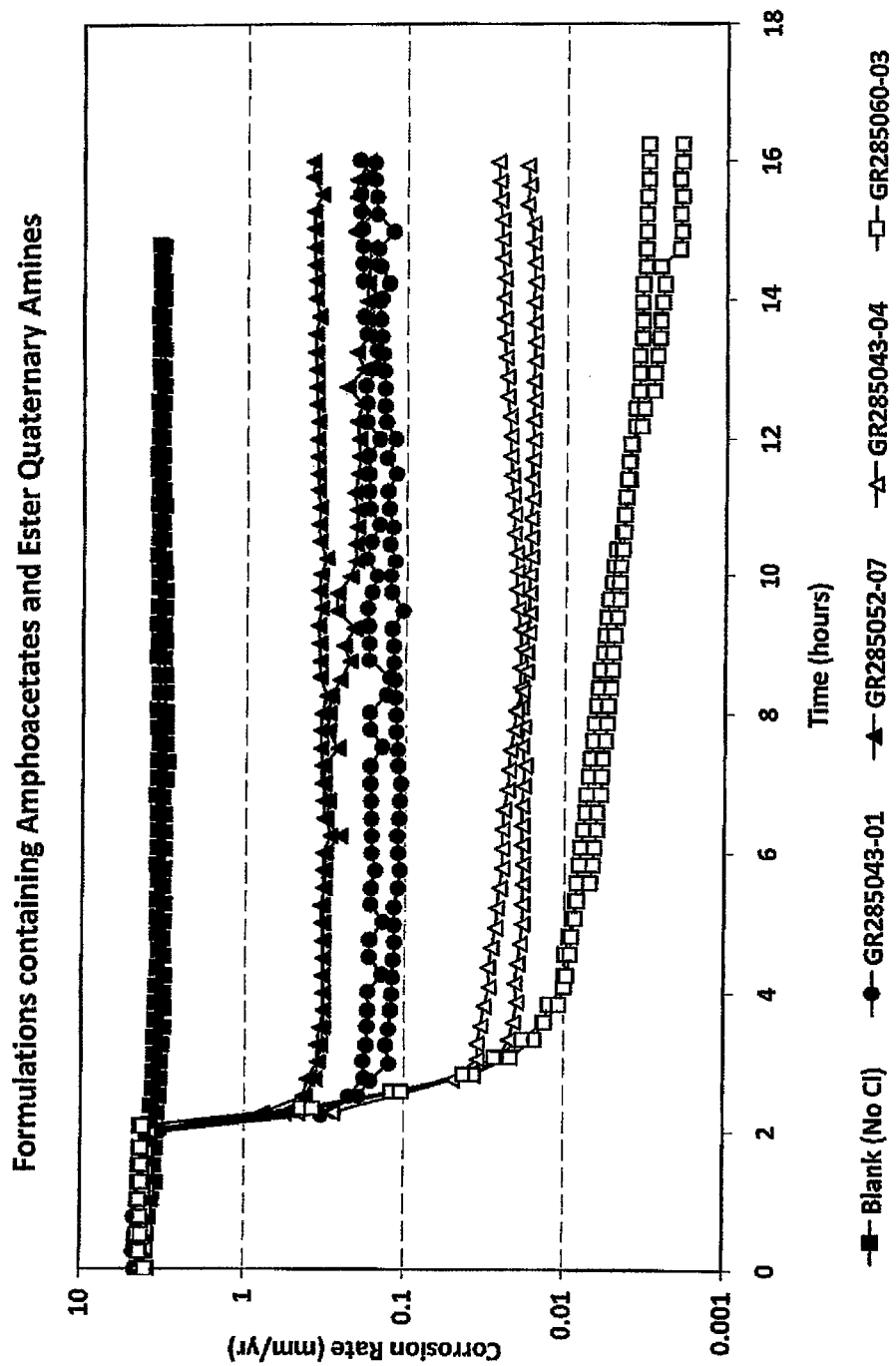

The compositions were each tested (in duplicate) in LPR Bubble test experiments using Brine A as described above. Following a 2 hour pre-corrosion stage, the composition was added to the kerosene phase of the LPR bubble test apparatus using an addition rate calculated to provide 50 ppm of the corrosion inhibitor(s), as a proportion of total fluids (kerosene plus water). A blank test wherein no corrosion inhibitor was added was also carried out. The blank test is shown in FIGS. 3 and 4 by solid black squares. All other details of the experiment are as described previously.

The results are shown in Tables 6a, 6b and 6c below and in FIGS. 3 and 4.

TABLE 6a

LPR Bubble Test Data for Base Ingredients

| Composition | Initial Corr. Rate (mmpy) | Final Corr. Rate (mmpy) | % Inhib. | % Inhib. (Average) |
|---|---|---|---|---|
| GR285043-02 | 4.09 | 1.714 | 58.12 | 58.39 |
| | 4.29 | 1.773 | 58.67 | |
| GR285043-01 | 4.19 | 0.192 | 95.41 | 96.00 |
| | 4.42 | 0.151 | 96.60 | |
| GR285052-01 | 4.50 | 0.005 | 99.89 | 99.86 |
| | 4.63 | 0.008 | 99.83 | |
| GR285052-07 | 4.39 | 0.382 | 91.30 | 93.40 |
| | 4.31 | 0.195 | 95.49 | |

TABLE 6b

LPR Bubble Test Data for Amphoacetates with Alkyl Quaternary Amine

| Composition | Initial Corr. Rate (mmpy) | Final Corr. Rate (mmpy) | % Inhib. | % Inhib. (Average) |
|---|---|---|---|---|
| GR285043-03 | 3.76 | 0.0002 | 99.99 | 99.98 |
| | 4.04 | 0.0011 | 99.97 | |
| GR285052-04 | 4.54 | 0.0007 | 99.98 | 99.98 |
| | 4.59 | 0.0011 | 99.98 | |

TABLE 6c

LPR Bubble Test Data for Amphoacetates with Ester Quaternary Amine

| Composition | Initial Corr. Rate (mmpy) | Final Corr. Rate (mmpy) | % Inhib. | % Inhib. (Average) |
|---|---|---|---|---|
| GR285043-04 | 4.00 | 0.029 | 99.27 | 99.44 |
| | 4.23 | 0.017 | 99.61 | |
| GR285060-03 | 4.35 | 0.003 | 99.93 | 99.94 |
| | 4.28 | 0.002 | 99.96 | |

The results in Tables 6 and FIGS. 3 and 4 show that the compositions comprising amphoacetates and either an alkyl quat or an ester quat show improved corrosion inhibition properties, compared to either component when used on their own.

FIG. 3 shows that compositions comprising an amphoacetate and an alkyl quat have significantly improved corrosion inhibition properties than either the amphoacetate alone or the alkyl quat alone. The compositions exhibit synergy. The performance of GR285043-03 is particularly strong. Significantly the amphoacetate used in these compositions is also environmentally acceptable.

FIG. 4 shows that compositions comprising an amphoacetate and an ester quat exhibit similar results, i.e. they show significantly improved corrosion inhibition properties than either the amphoacetate alone or the ester quat alone. The compositions exhibit synergy. Again the amphoacetate used in these compositions is environmentally acceptable.

The invention claimed is:

1. A corrosion inhibitor composition comprising:
a carrier;
at least one compound of formulae (II)-(III) or a salt thereof:

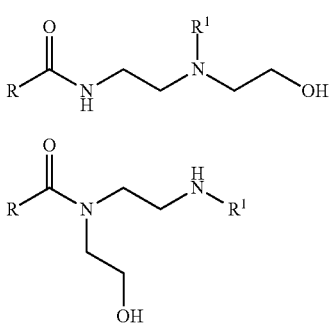

wherein
R is $C_{11}$ alkyl or $C_{11}$-$C_{13}$ alkyl;
$R^1$ is —$CH_2C(O)OZ$, and Z is H or a cation; and
a quaternary ammonium compound comprising at least one alkyl quat of formula (VIII):

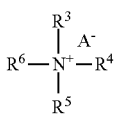

wherein $R^3$ and $R^4$ are methyl, $R^5$ and $R^6$ are decyl and $A^-$ is a carbonate or bicarbonate counter ion.

2. A composition as claimed in claim 1 comprising the at least one compound of formula (II) and the at least one compound of formula (III).

3. A corrosion inhibitor composition comprising:
a carrier;
at least one compound of formulae (II)-(III) or a salt thereof:

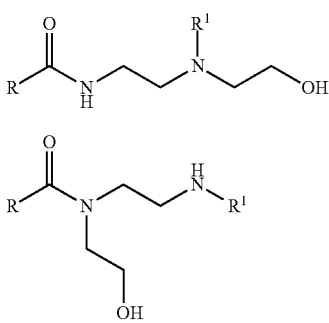

wherein R is $C_{5-21}$ alkyl or $C_{5-21}$ alkenyl; $R^1$ is —$CH_2CH(OH)CH_2SO_3Z$ and Z is H or a cation; and
a quaternary ammonium compound comprising at least one alkyl quat, at least one ester quat, or a combination thereof.

4. A composition as claimed in claim 1, wherein said compound of formulae (II)-(III) has a toxicity ($EC_{50}$), measured by a standard test: ISO 10253 1998 water quality—marine algal growth inhibition test with *Skeletonema costatum*, of at least 0.5 mg/L.

5. A composition as claimed in claim 3, wherein said alkyl quat is of formula (VIII):

wherein each of $R^3$, $R^4$, $R^5$ and $R^6$ is independently a $C_{1-20}$ alkyl group and $A^-$ is a halide, sulphate, carbonate or bicarbonate counter ion.

6. A composition as claimed in claim 5 comprising a compound of formula (VIIIa):

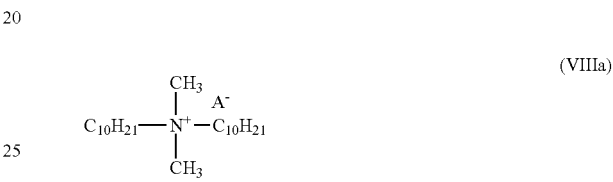

wherein $A^-$ is a sulphate or carbonate counter ion.

7. A composition as claimed in claim 3, wherein said ester quat is of formula (IX):

wherein
$R^8$, $R^9$ and $R^{10}$ are each independently $C_{1-4}$ alkyl, $C_{1-4}$ hydroxyalkyl, $C_{6-12}$ aryl, alkylaryl containing 7 to 13 carbon atoms or a group corresponding to formula (X):

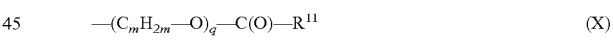

wherein m is an integer 2 or 3, q is an integer from 1 to 3 and $R^{11}$ is a $C_{7-23}$ alkyl or $C_{7-23}$ alkenyl group;
$R^7$ is a group corresponding to formula (X) or (XI):

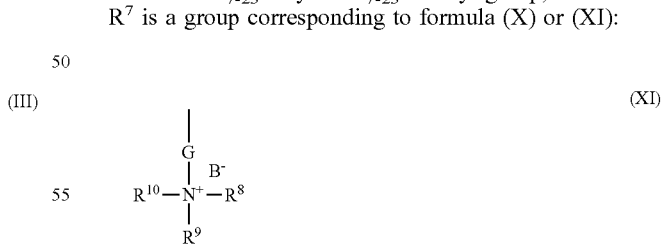

wherein $R^8$, $R^9$ and $R^{10}$ are as defined above, G is a group —$(CH_2)_p$— or a group —$(CH_2)_p$-E-CO-D-CO-E-$(CH_2)_p$— wherein p is an integer of 1 to 6, E is NH or O and D is a dimer fatty acid residue containing on average 36 to 54 carbon atoms; and
$B^-$ is an anion.

8. A composition as claimed in claim 1, wherein said carrier comprises at least one of methylethyl glycol, EGMBE and diethyl glycol.

9. A composition as claimed in claim 1, further comprising a sulphur-containing species comprising a thiosulphate salt, 2-mercaptoethanol, thioglycolic acid, $Na_2SO_3$, or a $C_{1-8}$ alkyl thiol.

10. A composition as claimed in claim 1, further comprising a surfactant.

11. A method of reducing, inhibiting or preventing corrosion of a metal surface, comprising contacting said surface with a corrosion inhibitor composition as defined in claim 1.

12. A method as claimed in claim 11, wherein said metal surface is used in the recovery, transportation or refining of hydrocarbon.

13. A kit for the preparation of a corrosion inhibitor composition comprising:
   (i) a first container comprising at least one compound of formulae (II)-(III) or a salt thereof as defined in claim 1;
   (ii) a second container comprising a quaternary ammonium compound as defined in claim 1; and
   (iii) instructions for preparation of the corrosion inhibitor composition.

14. A kit as claimed in claim 13, further comprising a sulphur-containing species in one of said containers or in a separate container.

15. A composition as claimed in claim 3, comprising at least one compound of formula (II), at least one compound of formula (III), and either an ester quat or an alkyl quat of formula (VIIIa):

(VIIIa)

wherein $A^-$ is a sulphate or carbonate counter ion.

16. A composition as claimed in claim 15, wherein the ester quat comprises an oleyl triethanolamine ester quat or a compound of formula (IX):

(IX)

wherein $R^8$, $R^9$ and $R^{10}$ are each independently $C_{1-4}$ alkyl, $C_{1-4}$ hydroxyalkyl, $C_{6-12}$ aryl, alkylaryl containing 7 to 13 carbon atoms or a group corresponding to formula (X):

(X)

wherein m is an integer 2 or 3, q is an integer from 1 to 3 and $R^{11}$ is a $C_{7-23}$ alkyl or $C_{7-23}$ alkenyl group;

$R^7$ is a group corresponding to formula (X) or (XI):

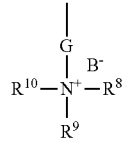

(XI)

wherein $R^8$, $R^9$ and $R^{10}$ are as defined above, G is a group —$(CH_2)_p$— or a group —$(CH_2)_p$-E-CO-D-CO-E-$(CH_2)_p$— wherein p is an integer of 1 to 6, E is NH or O and D is a dimer fatty acid residue containing on average 36 to 54 carbon atoms; and $B^-$ is an anion.

17. A composition as claimed in claim 3, wherein the ester quat comprises an oleyl triethanolamine ester quat.

18. A composition as claimed in claim 1, wherein the at least one compound of formulae (II)-(III) comprises a quaternary salt.

19. A composition as claimed in claim 1, further comprising an anionic surfactant.

20. A composition as claimed in claim 19, wherein the anionic surfactant comprises a phosphate ester, alkyl ether carboxylate, or a metal salt thereof.

21. A composition as claimed in claim 20, wherein the phosphate ester comprises a $C_6$-$C_{22}$ alkyl mono-substituted ester containing ethylene oxide or propylene oxide groups or a $C_6$-$C_{22}$ alkyl di-substituted ester containing ethylene oxide or propylene oxide groups.

22. A composition as claimed in claim 19, wherein the anionic surfactant comprises a $C_6$-$C_{22}$ alkyl ether carboxylate, a $C_6$-$C_{22}$ alkyl ether carboxylate containing ethylene oxide or propylene oxide groups, or a combination thereof.

23. A composition as claimed in claim 1, wherein the weight ratio of the compound of formulae (II) or (III) to the alkyl quat is 10:1 to 0.1:1.

24. A composition as claimed in claim 3, further comprising a sulphur-containing species comprising a thiosulphate salt, 2-mercaptoethanol, thioglycolic acid, $Na_2SO_3$, or a $C_{1-8}$ alkyl thiol.

25. A composition as claimed in claim 3, wherein the at least one compound of formulae (II)-(III) comprises a quaternary salt.

26. A composition as claimed in claim 3, further comprising an anionic surfactant.

27. A composition as claimed in claim 26, wherein the anionic surfactant comprises a phosphate ester, alkyl ether carboxylate, or a metal salt thereof.

28. A composition as claimed in claim 27, wherein the phosphate ester comprises a $C_6$-$C_{22}$ alkyl mono-substituted ester containing ethylene oxide or propylene oxide groups or a $C_6$-$C_{22}$ alkyl di-substituted ester containing ethylene oxide or propylene oxide groups.

29. A composition as claimed in claim 26, wherein the anionic surfactant comprises a $C_6$-$C_{22}$ alkyl ether carboxylate, a $C_6$-$C_{22}$ alkyl ether carboxylate containing ethylene oxide or propylene oxide groups, or a combination thereof.

30. A composition as claimed in claim 3, wherein the weight ratio of the compound of formulae (II) or (III) to the ester quat is 5:1 to 0.1:1.

* * * * *